US012580702B2

(12) United States Patent
Xu et al.

(10) Patent No.: US 12,580,702 B2
(45) Date of Patent: Mar. 17, 2026

(54) COMMUNICATION METHOD AND APPARATUS, AND COMPUTER-READABLE STORAGE MEDIUM

(71) Applicant: HUAWEI TECHNOLOGIES CO., LTD., Shenzhen (CN)

(72) Inventors: Minghui Xu, Shenzhen (CN); Fengwei Liu, Chengdu (CN); Jiayin Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 18/352,553

(22) Filed: Jul. 14, 2023

(65) Prior Publication Data

US 2024/0063964 A1      Feb. 22, 2024

Related U.S. Application Data

(63) Continuation of application No. PCT/CN2021/072319, filed on Jan. 15, 2021.

(51) Int. Cl.
*H04L 12/26* (2006.01)
*H04L 5/00* (2006.01)

(52) U.S. Cl.
CPC .......... *H04L 5/0048* (2013.01); *H04L 5/0005* (2013.01); *H04L 5/0064* (2013.01)

(58) Field of Classification Search
None
See application file for complete search history.

(56) References Cited

U.S. PATENT DOCUMENTS

2018/0323940 A1* 11/2018 Rico Alvarino ...... H04L 5/0057

FOREIGN PATENT DOCUMENTS

WO      WO-2015054268 A1 *  4/2015  ........... H04L 1/0089

* cited by examiner

*Primary Examiner* — Zewdu A Beyen
(74) *Attorney, Agent, or Firm* — Maier & Maier, PLLC

(57) ABSTRACT

A communication method, apparatus, and system. The method includes: determining a first configuration, a modulation order, and a first code rate, where the first configuration includes a mapping type, a time domain resource, and a first quantity and/or a first transmission quantity; determining a second code rate, a second quantity, and a second transmission quantity based on the first code rate, the mapping type, and the first quantity and/or the first transmission quantity; determining a valid resource of the second transport block based on the time domain resource, the second quantity, and the second transmission quantity; and sending second data to a first device based on first data, the modulation order, the second code rate, and the valid resource of the second transport block.

17 Claims, 10 Drawing Sheets

| 120k | s0 |
| 240k | s0 | s1 |
| 480k | s0 | s1 | s2 | s3 |
| 960k | s0 | s1 | s2 | s3 | s4 | s5 | s6 | s7 |

1

COMMUNICATION METHOD AND APPARATUS, AND COMPUTER-READABLE STORAGE MEDIUM

CROSS-REFERENCE TO RELATED APPLICATIONS

This application is a continuation of International Application No. PCT/CN2021/072319, filed on Jan. 15, 2021, the disclosure of which is hereby incorporated by reference in its entirety.

TECHNICAL FIELD

The embodiments relate to the field of communication technologies, a communication method and apparatus, and a computer-readable storage medium.

BACKGROUND

To meet a large bandwidth requirement, a large subcarrier spacing is proposed in the industry. Currently, a scheduling unit is a slot. A larger subcarrier spacing indicates shorter duration of a slot. After the duration of the slot becomes shorter, more slots are required for same duration. For more slots, there is a case of multi-slot scheduling during scheduling. When multi-slot scheduling is performed, configuration information of a transport block is configured once, so that a same transport block can be transmitted in different slots to improve coverage, or different transport blocks can be transmitted in different slots. However, regardless of a plurality of transmissions of a same transport block or a transmission of a plurality of transport blocks, a same symbol in a slot is occupied for each transmission of each transport block. Because the configuration information of the transport block is transmitted only in one slot, a symbol that corresponds to the configuration information in another slot does not need to be used to transmit the configuration information but cannot be used for data transmission. Consequently, valid resources in each slot cannot be used completely, causing a waste of resources.

SUMMARY

The embodiments may include a communication method, apparatus, and system, to reduce a transmission resource.

According to a first aspect, a communication method is provided. The communication method may be applied to a second device or may be applied to a module (for example, a chip) in a second device. The following uses the second device as an example for description. The communication method may include:

determining a first configuration, a modulation order, and a first code rate, where the first configuration includes a mapping type, a time domain resource, and a first quantity and/or a first transmission quantity, the first quantity is a quantity of first transport blocks, the first transmission quantity is a transmission quantity of the first transport block, and the first code rate is a code rate of the first transport block;

determining a second code rate, a second quantity, and a second transmission quantity based on the first code rate, the mapping type, and the first quantity and/or the first transmission quantity, where the second code rate is a code rate of a second transport block, the second quantity is a quantity of second transport blocks, and the second transmission quantity is a transmission quantity of the second transport block;

determining a valid resource of the second transport block based on the time domain resource, the second quantity, and the second transmission quantity; and sending second data to a first device based on first data, the modulation order, the second code rate, and the valid resource of the second transport block.

In this embodiment, a total time domain resource used to transmit a transport block is configured, but a time domain resource that is in the total time domain resource and that needs to be used for each transmission of each transport block is not configured. Therefore, a valid resource used for each transmission of each transport block may be determined based on a valid resource corresponding to the total time domain resource. In this way, resources can be used as much as possible, and a problem that each transport block can be transmitted only by using a fixed resource can be avoided, so that a waste of resources can be avoided, thereby reducing resources. In addition, because a resource used for each transmission of each transport block may be determined based on a total allocated resource, and a determining manner is different, the resource used for each transmission of each transport block may be different, thereby improving flexibility of resource determining.

In a possible implementation, when the mapping type is a first type, the determining a second code rate, a second quantity, and a second transmission quantity based on the first code rate, the mapping type, and the first quantity and/or the first transmission quantity includes:

dividing, based on a valid resource in each slot in the time domain resource, slots included in the time domain resource into M slot portions, where M is an integer greater than or equal to 1, and an absolute value of a difference between valid resources in any two slots included in any one of the M slot portions is less than or equal to a first threshold;

determining the second quantity and the second transmission quantity based on a quantity of slots included in each of the M slot portions and the first transmission quantity; and determining the second code rate based on the first code rate, the first transmission quantity, and the second transmission quantity.

In this embodiment, a transmission quantity of a transmitted transport block and a quantity of transmitted transport blocks may be determined based on a configured transmission quantity of the transport block and the valid resource in each slot in the total time domain resource. It can be understood that the transmission quantity of the transmitted transport block and the quantity of transmitted transport blocks may be adaptively adjusted based on the valid resource corresponding to the time domain resource, so that resources can be appropriately used, and a waste of resources can be avoided, thereby improving spectral efficiency and reducing resources. In addition, a code rate of the transmitted transport block may be further adjusted based on the adjusted transmission quantity of the transmitted transport block, to ensure that equivalent code rates of the transport blocks are the same, so that demodulation performance of different transport blocks is more similar, a channel condition is better matched, and spectral efficiency is improved. Further, valid resources corresponding to slots for transmitting different redundancy versions of a same transport block are close, so that valid information carried in different slots for transmitting the same transport block is as close as possible, thereby improving robustness in a plurality of slots, reducing a waste of resources, and improving resource utilization.

In a possible implementation, the determining the second quantity and the second transmission quantity based on a quantity of slots included in each of the M slot portions and the first transmission quantity includes:

determining, based on the quantity of slots included in each of the M slot portions and the first transmission quantity, that the second quantity and the second transmission quantity meet the following relationships:

$$N_{2,m} = \lceil N_{s,m}/K_1 \rceil, \text{ and}$$

$$K_{2,m,k} = \begin{cases} K_1 & k = 1, \dots, N_{2,m} - 1 \\ \mod(N_{s,m}, K_1) & k = N_{2,m} \end{cases}$$

$N_{2,m}$ is a quantity of second transport blocks transmitted in an $m^{th}$ slot portion in the M slot portions, $N_{s,m}$ is a quantity of slots included in the $m^{th}$ slot portion, $K_1$ is the first transmission quantity, $K_{2,m,k}$ is a second transmission quantity of a $k^{th}$ second transport block in the second transport blocks transmitted in the $m^{th}$ slot portion, $\lceil \cdot \rceil$ is rounding up, $\mod(\cdot)$ is a modulo operation, and $m=1, \dots, M$.

In this embodiment, the transmission quantity of the transmitted transport block and the quantity of transmitted transport blocks may be adaptively adjusted based on a valid resource included in a slot corresponding to the time domain resource and an indicated transmission quantity, so that resources can be appropriately used, and a waste of resources can be avoided, thereby improving spectral efficiency and reducing resources.

In a possible implementation, the determining, based on the first code rate, the first transmission quantity, and the second transmission quantity, that a second code rate of a $j^{th}$ second transport block meets the following relationship:

$$C_1 \times K_{2,j}/K_1$$

$C_1$ is the first code rate, $K_1$ is the first transmission quantity, $K_{2,j}$ is a second transmission quantity of the $j^{th}$ second transport block, $j=1, \dots, N_2$, and $N_2$ is the second quantity.

In this embodiment, the code rate of the transmitted transport block may be inversely proportional to the indicated transmission quantity of the transport block and may be directly proportional to the transmission quantity of the transmitted transport block. It can be understood that a smaller transmission quantity of the transport block indicates a smaller code rate of the transmitted transport block, and it can be ensured that the equivalent code rates of the transport blocks are the same or similar.

In a possible implementation, when the mapping type is a second type, the determining a second code rate, a second quantity, and a second transmission quantity based on the first code rate, the mapping type, and the first quantity and/or the first transmission quantity includes:

determining the first code rate as the second code rate;
determining the first quantity as the second quantity; and
determining the first transmission quantity as the second transmission quantity.

In a possible implementation, the determining a valid resource of the second transport block based on the time domain resource, the second quantity, and the second transmission quantity includes:

determining a total valid resource based on the time domain resource, where the total valid resource is a resource in a time-frequency resource other than a resource occupied by one or more of a control channel, a synchronization signal block, a reference signal, a random access channel, a reserved resource, and overheads; and the time-frequency resource is a time-frequency resource scheduled for the first data; and determining the valid resource of the second transport block based on the total valid resource, the second quantity, and the second transmission quantity.

In this embodiment, when the indicated transmission quantity of the transport block and the indicated quantity of transport blocks are directly used, a total resource that can be used for each transmission of each transport block may be allocated, to ensure reasonableness of the valid resource used for each transmission of each transport block, and use the valid resource as much as possible, thereby avoiding a waste of resources, improving spectral efficiency, and reducing resources.

In a possible implementation, the determining a valid resource of the second transport block based on the total valid resource, the second quantity, and the second transmission quantity includes:

dividing the total valid resource into valid resources of the second quantity, to obtain the valid resource of the second transport block, where the valid resource is a symbol, a resource element, or a resource block; and dividing the valid resource of the second transport block into valid resources of the second transmission quantity, to obtain a valid resource for each transmission of the second transport block.

In this embodiment, during resource division, division may be first performed based on transport blocks, and then each transport block may be divided based on a transmission quantity. This can ensure that resources used for different transport blocks and different transmission quantities are as same as possible, so that quantities of code blocks of the transport blocks are the same or similar, and demodulation performance is close, thereby reducing a retransmission probability and improving spectral efficiency.

In a possible implementation, the determining a valid resource of the second transport block based on the total valid resource, the second quantity, and the second transmission quantity includes:

dividing the total valid resource into valid resources of a first product, to obtain a valid resource for each transmission of the second transport block, where the first product is a product of the second quantity and the second transmission quantity, and the valid resource is a resource element or a resource block.

In this embodiment, during resource division, division may be performed based on a total transmission quantity of all transport blocks, to ensure that resources used for different transmission quantities and different transport blocks are as same as possible, so that quantities of code blocks of the transport blocks are the same or similar, and demodulation performance is close, thereby reducing a retransmission probability and improving spectral efficiency.

In a possible implementation, the first quantity and/or the first transmission quantity are/is a power of 2.

In a possible implementation, the communication method may further include:

sending control information to a terminal device, where the control information indicates the first configuration, the modulation order, and the first code rate; and sending first signaling to the terminal device, where the first signaling indicates a plurality of configurations, and the plurality of configurations include the first configuration.

In this embodiment, when the second device is an access network device, the second device may send signaling to the terminal device to indicate a plurality of configurations, and indicate one of the plurality of configurations by using control information, so that the terminal device can determine, based on the signaling and the control information, a configuration to be used for sending or receiving data, to perform data transmission. In addition, with limited signaling overheads of the control information, a flexible configuration is ensured to match different channel conditions.

In a possible implementation, the control information includes a first indication field, the first indication field indicates a correspondence between a redundancy version and n, the first indication field is 1 bit, n represents an $n^{th}$ transmission of the second transport block, $n=1, 2, \ldots, N_2$, and $N_2$ is the second quantity.

In this embodiment, when the second device is an access network device, different redundancy versions used for different transmission quantities of the transport blocks may be indicated to the terminal device by using the control information, so that the terminal device can send data based on the control information, or determine, from received data based on the control information, data sent by a transmit end. In addition, a plurality of redundancy versions may be transmitted by using a plurality of transmissions, to increase a probability that a receive end successfully detects received signals of different redundancy versions after soft combination is performed on the received signals and improve spectral efficiency.

In a possible implementation, the sending first data to a first device based on the modulation order, the second code rate, and the valid resource of the second transport block includes:

determining a transport block size of the second transport block based on the modulation order, the second code rate, and the valid resource of the second transport block;

encoding the first data based on the transport block size, to obtain the second data; and sending the second data to the first device.

In this embodiment, the second device may first determine the transport block size, so as to encode to-be-sent data based on the transport block size.

In a possible implementation, a granularity of the time domain resource is one symbol, $2^{\Delta\mu}$ symbols, or a predefined time unit, and $\Delta\mu$ is determined based on a scheduled subcarrier spacing and a reference subcarrier spacing.

In this embodiment, the time domain resource may no longer be at a granularity of a slot, but at a granularity of a smaller symbol or time unit, so that the second device can appropriately use the resource when transmitting data, thereby improving resource utilization, reducing resources, and improving spectral efficiency.

According to a second aspect, a communication method is provided. The communication method may be applied to a first device or may be applied to a module (for example, a chip) in a first device. The following uses the first device as an example for description. The communication method may include:

determining a first configuration, a modulation order, and a first code rate, where the first configuration includes a mapping type, a time domain resource, and a first quantity and/or a first transmission quantity, the first quantity is a quantity of first transport blocks, the first transmission quantity is a transmission quantity of the first transport block, and the first code rate is a code rate of the first transport block;

determining a second code rate, a second quantity, and a second transmission quantity based on the first code rate, the mapping type, and the first quantity and/or the first transmission quantity, where the second code rate is a code rate of a second transport block, the second quantity is a quantity of second transport blocks, and the second transmission quantity is a transmission quantity of the second transport block;

determining a valid resource of the second transport block based on the time domain resource, the second quantity, and the second transmission quantity;

receiving second data from a second device; and determining first data based on the second data, the modulation order, the second code rate, and the valid resource of the second transport block.

In this embodiment, a total time domain resource used to transmit a transport block may be configured, but a time domain resource that is in the total time domain resource and that needs to be used for each transmission of each transport block may not be configured. Therefore, a transmit end may determine, based on a valid resource corresponding to the total time domain resource, a valid resource used for each transmission of each transport block. In this way, resources can be used as much as possible, and a problem that each transport block can be transmitted only by using a fixed resource can be avoided, so that a waste of resources can be avoided, thereby improving spectral efficiency and reducing the resources. Because the transmit end and a receive end have a same configuration, the receive end may also perform corresponding processing, to determine, based on received data, data sent by the transmit end. In addition, because a resource used for each transmission of each transport block may be determined based on a total allocated resource, and a determining manner is different, the resource used for each transmission of each transport block may be different, thereby improving flexibility of resource determining.

In a possible implementation, when the mapping type is a first type, the determining a second code rate, a second quantity, and a second transmission quantity based on the first code rate, the mapping type, and the first quantity and/or the first transmission quantity includes:

dividing, based on a valid resource in each slot in the time domain resource, slots included in the time domain resource into M slot portions, where M is an integer greater than or equal to 1, and an absolute value of a difference between valid resources in any two slots included in any one of the M slot portions is less than or equal to a first threshold;

determining the second quantity and the second transmission quantity based on a quantity of slots included in each of the M slot portions and the first transmission quantity; and determining the second code rate based on the first code rate, the first transmission quantity, and the second transmission quantity.

In this embodiment, a transmission quantity of a transmitted transport block and a quantity of transmitted transport blocks may be determined based on a configured transmission quantity of the transport block and the valid resource in each slot in the total time domain resource. It can be understood that the transmission quantity of the transmitted transport block and the quantity of transmitted transport blocks may be adaptively adjusted based on the valid resource corresponding to the time domain resource, so that resources can be appropriately used, and a waste of resources can be avoided, thereby improving spectral efficiency. In addition, a code rate of the transmitted transport block may be further adjusted based on the adjusted transmission quantity of the transmitted transport block, to ensure that equivalent code rates of the transport blocks are the same, so that demodulation performance of different transport blocks is more similar, a channel condition is better matched, and spectral efficiency is improved. Further, valid resources corresponding to slots for transmitting different redundancy versions of a same transport block are close, so that valid information carried in different slots for transmitting the same transport block is as close as possible, thereby improving robustness in a plurality of slots, reducing a waste of resources, and improving resource utilization.

In a possible implementation, the determining the second quantity and the second transmission quantity based on a quantity of slots included in each of the M slot portions and the first transmission quantity includes:

determining, based on the quantity of slots included in each of the M slot portions and the first transmission quantity, that the second quantity and the second transmission quantity meet the following relationships:

$$N_{2,m} = \lceil N_{s,m}/K_1 \rceil, \text{ and}$$

$$K_{2,m,k} = \begin{cases} K_1 & k = 1, \ldots, N_{2,m} - 1 \\ \mathrm{mod}(N_{s,m}, K_1) & k = N_{2,m} \end{cases}$$

$N_{2,m}$ is a quantity of second transport blocks transmitted in an $m^{th}$ slot portion in the M slot portions, $N_{s,m}$ is a quantity of slots included in the $m^{th}$ slot portion, $K_1$ is the first transmission quantity, $K_{2,m,k}$ is a second transmission quantity of a $k^{th}$ second transport block in the second transport blocks transmitted in the $m^{th}$ slot portion, $\lceil \cdot \rceil$ is rounding up, $\mathrm{mod}(\cdot)$ is a modulo operation, and $m=1, \ldots, M$.

In this embodiment, the transmission quantity of the transmitted transport block and the quantity of transmitted transport blocks may be adaptively adjusted based on a valid resource included in a slot corresponding to the time domain resource and an indicated transmission quantity, so that resources can be appropriately used, and a waste of resources can be avoided, thereby improving spectral efficiency.

In a possible implementation, the determining, based on the first code rate, the first transmission quantity, and the second transmission quantity, that a second code rate of a $j^{th}$ second transport block meets the following relationship:

$$C_1 \times K_{2,j}/K_1$$

$C_1$ is the first code rate, $K_1$ is the first transmission quantity, $K_{2,j}$ is a second transmission quantity of the $j^{th}$ second transport block, $j=1, \ldots, N_2$, and $N_2$ is the second quantity.

In this embodiment, the code rate of the transmitted transport block is inversely proportional to the indicated transmission quantity of the transport block and is directly proportional to the transmission quantity of the transmitted transport block. It can be understood that a smaller transmission quantity of the transport block indicates a smaller code rate of the transmitted transport block, and it can be ensured that the equivalent code rates of the transport blocks are the same or similar.

In a possible implementation, when the mapping type is a second type, the determining a second code rate, a second quantity, and a second transmission quantity based on the first code rate, the mapping type, and the first quantity and/or the first transmission quantity includes:

determining the first code rate as the second code rate;

determining the first quantity as the second quantity; and determining the first transmission quantity as the second transmission quantity.

In a possible implementation, the determining a valid resource of the second transport block based on the time domain resource, the second quantity, and the second transmission quantity includes:

determining a total valid resource based on the time domain resource, where the total valid resource is a resource in a time-frequency resource other than a resource occupied by one or more of a control channel, a synchronization signal block, a reference signal, a random access channel, a reserved resource, and overheads; and the time-frequency resource is a time-frequency resource scheduled for the first data; and determining the valid resource of the second transport block based on the total valid resource, the second quantity, and the second transmission quantity.

In this embodiment, when the indicated transmission quantity of the transport block and the indicated quantity of transport blocks are directly used, a total resource that can be used for each transmission of each transport block may be allocated, to ensure reasonableness of the valid resource used for each transmission of each transport block, and use the valid resource as much as possible, thereby avoiding a waste of resources, improving spectral efficiency.

In a possible implementation, the determining a valid resource of the second transport block based on the total valid resource, the second quantity, and the second transmission quantity includes:

dividing the total valid resource into valid resources of the second quantity, to obtain the valid resource of the second transport block, where the valid resource is a symbol, a resource element, or a resource block; and dividing the valid resource of the second transport block into valid resources of the second transmission quantity, to obtain a valid resource for each transmission of the second transport block.

In this embodiment, during resource division, division may be first performed based on transport blocks, and then each transport block is divided based on a transmission quantity. This can ensure that resources used for different transport blocks and different transmission quantities are as same as possible, so that quantities of code blocks of the transport blocks are the same or similar, and demodulation performance is close, thereby reducing a retransmission probability and improving spectral efficiency.

In a possible implementation, the determining a valid resource of the second transport block based on the total valid resource, the second quantity, and the second transmission quantity includes:

dividing the total valid resource into valid resources of a first product, to obtain a valid resource for each transmission of the second transport block, where the first product is a product of the second quantity and the second transmission quantity, and the valid resource is a resource element or a resource block.

In this embodiment, during resource division, division may be performed based on a total transmission quantity of all transport blocks, to ensure that resources used for different transmission quantities and different transport blocks are as same as possible, so that quantities of code blocks of the transport blocks are the same or similar, and demodulation performance is close, thereby reducing a retransmission probability and improving spectral efficiency.

In a possible implementation, the first quantity and/or the first transmission quantity are/is a power of 2.

In a possible implementation, the communication method may further include:

sending control information to a terminal device, where the control information indicates the first configuration, the modulation order, and the first code rate; and sending first signaling to the terminal device, where the first signaling indicates a plurality of configurations, and the plurality of configurations include the first configuration.

In this embodiment, when the first device is an access network device, the second device may send signaling to the terminal device to indicate a plurality of configurations, and indicate one of the plurality of configurations by using control information, so that the terminal device can determine, based on the signaling and the control information, a configuration to be used for sending or receiving data, to perform data transmission. In addition, with limited signaling overheads of the control information, a flexible configuration is ensured to match different channel conditions.

In a possible implementation, the control information includes a first indication field, the first indication field indicates a correspondence between a redundancy version and n, the first indication field is 1 bit, n represents an $n^{th}$ transmission of the second transport block, $n=1, 2, \ldots, N_2$, and $N_2$ is the second quantity.

In this embodiment, when the first device is an access network device, different redundancy versions used for different transmission quantities of the transport blocks may be indicated to the terminal device by using the control information, so that the terminal device can send data based on the control information, or determine, from received data based on the control information, data sent by a transmit end. In addition, a plurality of redundancy versions may be transmitted by using a plurality of transmissions, to increase a probability that a receive end successfully detects received signals of different redundancy versions after soft combination is performed on the received signals and improve spectral efficiency.

In a possible implementation, the determining first data based on the second data, the modulation order, the second code rate, and the valid resource of the second transport block includes:

determining a transport block size of the second transport block based on the modulation order, the second code rate, and the valid resource of the second transport block; and decoding the second data based on the transport block size, to obtain the first data.

In this embodiment, the first device may first determine the transport block size, so that the first device can decode the received data based on the transport block size, to determine the data sent by the transmit end.

In a possible implementation, a granularity of the time domain resource is one symbol, $2^{\Delta\mu}$ symbols, or a predefined time unit, and $\Delta\mu$ is determined based on a scheduled subcarrier spacing and a reference subcarrier spacing.

In this embodiment, the time domain resource may no longer be at a granularity of a slot, but at a granularity of a smaller symbol or time unit, so that the resource can be appropriately used during data transmission, thereby improving resource utilization and improving spectral efficiency.

According to a third aspect, a communication method is provided. The communication method may be applied to a second device or may be applied to a module (for example, a chip) in a second device. The following uses the second device as an example for description. The communication method may include:

determining a first configuration, a modulation order, and a first code rate, where the first configuration includes information about a first quantity of first transport blocks, the information includes a first transmission quantity and a time domain resource, and the first code rate is a code rate of the first transport block;

determining a second code rate, a second quantity, and a second transmission quantity based on the first code rate and a first transmission quantity of an $i^{th}$ first transport block, where the second code rate is a code rate of a second transport block corresponding to the $i^{th}$ first transport block, the second quantity is a quantity of second transport blocks corresponding to the $i^{th}$ first transport block, the second transmission quantity is a transmission quantity of the second transport block corresponding to the $i^{th}$ first transport block, $i=1, 2, \ldots, N_1$, and $N_1$ is the first quantity;

determining a valid resource of the second transport block based on a time domain resource of the $i^{th}$ first transport block, the second quantity, and the second transmission quantity; and sending second data to a first device based on first data, the modulation order, the second code rate, and the valid resource of the second transport block.

In this embodiment, time domain resources and transmission quantities of different transport blocks may be separately configured, so that the transport blocks can be flexibly mapped in a plurality of slots, and valid resources of different redundancy versions of different transport blocks in the plurality of slots can be appropriately allocated, thereby reducing a waste of resources, improving spectral efficiency, and reducing resources.

In a possible implementation, the determining a second code rate, a second quantity, and a second transmission quantity based on the first code rate and a first transmission quantity of an $i^{th}$ first transport block includes:

determining the first code rate as the second code rate;

determining that the second quantity is 1; and determining the first transmission quantity of the $i^{th}$ first transport block as the second transmission quantity.

In a possible implementation, the determining a valid resource of the second transport block based on a time domain resource of the $i^{th}$ first transport block, the second quantity, and the second transmission quantity includes:

determining a valid resource of the $i^{th}$ first transport block based on the time domain resource of the $i^{th}$ first transport block, where the valid resource is a symbol, a resource element, or a resource block; and dividing the valid resource into valid resources of the second transmission quantity, to obtain a valid resource for each transmission of the second transport block.

In this embodiment, when an indicated transmission quantity of the transport block and an indicated quantity of transport blocks are directly used, a resource for each transmission of each transport block can be appropriately allocated based on a time domain resource indicated by each transport block. This can improve resource utilization, thereby avoiding a waste of resources and improving spectral efficiency.

In a possible implementation, the determining a second code rate, a second quantity, and a second transmission quantity based on the first code rate and a first transmission quantity of an $i^{th}$ first transport block includes:

> determining valid resources on different symbols in an $i^{th}$ time domain resource, where the $i^{th}$ time domain resource is the time domain resource of the $i^{th}$ first transport block, and the valid resources are resource elements or resource blocks;
>
> dividing, based on the valid resources, the symbols corresponding to the $i^{th}$ time domain resource into $M_i$ symbol portions, where $M_i$ is an integer greater than or equal to 1, and an absolute value of a difference between valid resources on any two symbols included in each of the $M_i$ symbol portions is less than or equal to a second threshold;
>
> determining the second quantity and the second transmission quantity based on a portion quantity $M_i$ a quantity of symbols included in each of the $M_i$ symbol portions, and the first transmission quantity of the $i^{th}$ first transport block; and
>
> determining the second code rate based on the first code rate, the first transmission quantity of the $i^{th}$ first transport block, and the second transmission quantity.

In this embodiment, a transmission quantity of a transmitted transport block and a quantity of transmitted transport blocks may be determined based on a configured transmission quantity and a configured time domain resource of each transport block. It can be understood that the transmission quantity of the transmitted transport block and the quantity of transmitted transport blocks may be adaptively adjusted based on the valid resource corresponding to the configured time domain resource, so that resources can be appropriately used, and a waste of resources can be avoided, thereby improving spectral efficiency. In addition, a code rate of the transmitted transport block may be further adjusted based on the adjusted transmission quantity of the transmitted transport block, to ensure that equivalent code rates of the transport blocks are the same, so that demodulation performance of different transport blocks is more similar, a channel condition is better matched, and spectral efficiency is improved. Further, valid resources corresponding to slots for transmitting different redundancy versions of a same transport block are close, so that valid information carried in different slots for transmitting the same transport block is as close as possible, thereby improving robustness in a plurality of slots, reducing a waste of resources, and improving resource utilization.

In a possible implementation, the first quantity and/or the first transmission quantity are/is a power of 2.

In a possible implementation, the communication method may further include:

> sending control information to a terminal device, where the control information indicates the first configuration, the modulation order, and the first code rate; and
>
> sending first signaling to the terminal device, where the first signaling indicates a plurality of configurations, and the plurality of configurations include the first configuration.

In this embodiment, when the second device is an access network device, the second device may send signaling to the terminal device to indicate a plurality of configurations, and indicate one of the plurality of configurations by using control information, so that the terminal device can determine, based on the signaling and the control information, a configuration to be used for sending or receiving data, to perform data transmission. In addition, with limited signaling overheads of the control information, a flexible configuration is ensured to match different channel conditions.

In a possible implementation, the control information includes a first indication field, the first indication field indicates a correspondence between a redundancy version and n, the first indication field is 1 bit, n represents an $n^{th}$ transmission of the second transport block, n=1, 2, . . . , $N_2$, and $N_2$ is the second quantity.

In this embodiment, when the second device is an access network device, different redundancy versions used for different transmission quantities of the transport blocks may be indicated to the terminal device by using the control information, so that the terminal device can send data based on the control information, or determine, from received data based on the control information, data sent by a transmit end. In addition, a plurality of redundancy versions may be transmitted by using a plurality of transmissions, to increase a probability that a receive end successfully detects received signals of different redundancy versions after soft combination is performed on the received signals and improve spectral efficiency.

In a possible implementation, the sending first data to a first device based on the modulation order, the second code rate, and the valid resource of the second transport block includes:

> determining a transport block size of the second transport block based on the modulation order, the second code rate, and the valid resource of the second transport block;
>
> encoding the first data based on the transport block size, to obtain the second data; and
>
> sending the second data to the first device.

In this embodiment, the second device may first determine the transport block size, so as to encode to-be-sent data based on the transport block size.

In a possible implementation, a granularity of the time domain resource is one symbol, $2^{\Delta\mu}$ symbols, or a predefined time unit, and $\Delta\mu$ is determined based on a scheduled subcarrier spacing and a reference subcarrier spacing.

In this embodiment, the time domain resource may no longer be at a granularity of a slot, but at a granularity of a smaller symbol or time unit, so that the second device can appropriately use the resource when transmitting data, thereby improving resource utilization and improving spectral efficiency.

According to a fourth aspect, a communication method is provided. The communication method may be applied to a first device or may be applied to a module (for example, a chip) in a first device. The following uses the first device as an example for description. The communication method may include:

> determining a first configuration, a modulation order, and a first code rate, where the first configuration includes information about a first quantity of first transport blocks, the information includes a first transmission quantity and a time domain resource, and the first code rate is a code rate of the first transport block;
>
> determining a second code rate, a second quantity, and a second transmission quantity based on the first code rate and a first transmission quantity of an $i^{th}$ first transport block, where the second code rate is a code rate of a second transport block corresponding to the $i^{th}$ first transport block, the second quantity is a quantity of second transport blocks corresponding to the $i^{th}$ first transport block, the second transmission quantity is a transmission quantity of the second transport block corresponding to the $i^{th}$ first transport block, i=1, 2, . . . , $N_1$, and $N_1$ is the first quantity;

determining a valid resource of the second transport block based on a time domain resource of the $i^{th}$ first transport block, the second quantity, and the second transmission quantity;

receiving second data from a second device; and determining first data based on the second data, the modulation order, the second code rate, and the valid resource of the second transport block.

In this embodiment, time domain resources and transmission quantities of different transport blocks may be separately configured, so that the transport blocks can be flexibly mapped in a plurality of slots, and valid resources of different redundancy versions of different transport blocks in the plurality of slots can be appropriately allocated, thereby reducing a waste of resources, improving spectral efficiency, and reducing resources.

In a possible implementation, the determining a second code rate, a second quantity, and a second transmission quantity based on the first code rate and a first transmission quantity of an $i^{th}$ first transport block includes:

determining the first code rate as the second code rate;

determining that the second quantity is 1; and determining the first transmission quantity of the $i^{th}$ first transport block as the second transmission quantity.

In a possible implementation, the determining a valid resource of the second transport block based on a time domain resource of the $i^{th}$ first transport block, the second quantity, and the second transmission quantity includes:

determining a valid resource of the $i^{th}$ first transport block based on the time domain resource of the $i^{th}$ first transport block, where the valid resource is a symbol, a resource element, or a resource block; and dividing the valid resource into valid resources of the second transmission quantity, to obtain a valid resource for each transmission of the second transport block.

In this embodiment, when an indicated transmission quantity of the transport block and an indicated quantity of transport blocks are directly used, a resource for each transmission of each transport block can be appropriately allocated based on a time domain resource indicated by each transport block. This can improve resource utilization, thereby avoiding a waste of resources and improving spectral efficiency.

In a possible implementation, the determining a second code rate, a second quantity, and a second transmission quantity based on the first code rate and a first transmission quantity of an $i^{th}$ first transport block includes:

determining valid resources on different symbols in an $i^{th}$ time domain resource, where the $i^{th}$ time domain resource is the time domain resource of the $i^{th}$ first transport block, and the valid resources are resource elements or resource blocks;

dividing, based on the valid resources, the symbols corresponding to the $i^{th}$ time domain resource into $M_i$ symbol portions, where $M_i$ is an integer greater than or equal to 1, and an absolute value of a difference between valid resources on any two symbols included in each of the $M_i$ symbol portions is less than or equal to a second threshold;

determining the second quantity and the second transmission quantity based on a portion quantity $M_i$, a quantity of symbols included in each of the $M_i$ symbol portions, and the first transmission quantity of the $i^{th}$ first transport block; and determining the second code rate based on the first code rate, the first transmission quantity of the $i^{th}$ first transport block, and the second transmission quantity.

In this embodiment, a transmission quantity of a transmitted transport block and a quantity of transmitted transport blocks may be determined based on a configured transmission quantity and a configured time domain resource of each transport block. It can be understood that the transmission quantity of the transmitted transport block and the quantity of transmitted transport blocks may be adaptively adjusted based on the valid resource corresponding to the configured time domain resource, so that resources can be appropriately used, and a waste of resources can be avoided, thereby improving spectral efficiency. In addition, a code rate of the transmitted transport block may be further adjusted based on the adjusted transmission quantity of the transmitted transport block, to ensure that equivalent code rates of the transport blocks are the same, so that demodulation performance of different transport blocks is more similar, a channel condition is better matched, and spectral efficiency is improved. Further, valid resources corresponding to slots for transmitting different redundancy versions of a same transport block are close, so that valid information carried in different slots for transmitting the same transport block is as close as possible, thereby improving robustness in a plurality of slots, reducing a waste of resources, and improving resource utilization.

In a possible implementation, the first quantity and/or the first transmission quantity are/is a power of 2.

In a possible implementation, the communication method may further include:

sending control information to a terminal device, where the control information indicates the first configuration, the modulation order, and the first code rate; and sending first signaling to the terminal device, where the first signaling indicates a plurality of configurations, and the plurality of configurations include the first configuration.

In this embodiment, when the first device is an access network device, the second device may send signaling to the terminal device to indicate a plurality of configurations, and indicate one of the plurality of configurations by using control information, so that the terminal device can determine, based on the signaling and the control information, a configuration to be used for sending or receiving data, to perform data transmission. In addition, with limited signaling overheads of the control information, a flexible configuration is ensured to match different channel conditions.

In a possible implementation, the control information includes a first indication field, the first indication field indicates a correspondence between a redundancy version and n, the first indication field is 1 bit, n represents an $n^{th}$ transmission of the second transport block, $n = 1, 2, \ldots, N_2$, and $N_2$ is the second quantity.

In this embodiment, when the first device is an access network device, different redundancy versions used for different transmission quantities of the transport blocks may be indicated to the terminal device by using the control information, so that the terminal device can send data based on the control information, or determine, from received data based on the control information, data sent by a transmit end. In addition, a plurality of redundancy versions may be transmitted by using a plurality of transmissions, to increase a probability that a receive end successfully detects received signals of different redundancy versions after soft combination is performed on the received signals and improve spectral efficiency.

In a possible implementation, the determining first data based on the second data, the modulation order, the second code rate, and the valid resource of the second transport block includes:

determining a transport block size of the second transport block based on the modulation order, the second code rate, and the valid resource of the second transport block; and decoding the second data based on the transport block size, to obtain the first data.

In this embodiment, the first device may first determine the transport block size, so that the first device can decode the received data based on the transport block size, to determine the data sent by the transmit end.

In a possible implementation, a granularity of the time domain resource is one symbol, $2^{\Delta\mu}$ symbols, or a predefined time unit, and $\Delta\mu$ is determined based on a scheduled subcarrier spacing and a reference subcarrier spacing.

In this embodiment, the time domain resource may no longer be at a granularity of a slot, but at a granularity of a smaller symbol or time unit, so that the resource can be appropriately used during data transmission, thereby improving resource utilization and improving spectral efficiency.

According to a fifth aspect, a communication apparatus is provided. The communication apparatus may be a second device, or may be a module (for example, a chip) in a second device. The communication apparatus may include:

a first determining unit, configured to determine a first configuration, a modulation order, and a first code rate, where the first configuration includes a mapping type, a time domain resource, and a first quantity and/or a first transmission quantity, the first quantity is a quantity of first transport blocks, the first transmission quantity is a transmission quantity of the first transport block, and the first code rate is a code rate of the first transport block;

a second determining unit, configured to determine a second code rate, a second quantity, and a second transmission quantity based on the first code rate, the mapping type, and the first quantity and/or the first transmission quantity, where the second code rate is a code rate of a second transport block, the second quantity is a quantity of second transport blocks, and the second transmission quantity is a transmission quantity of the second transport block;

a third determining unit, configured to determine a valid resource of the second transport block based on the time domain resource, the second quantity, and the second transmission quantity; and a sending unit, configured to send second data to a first device based on first data, the modulation order, the second code rate, and the valid resource of the second transport block.

In a possible implementation, when the mapping type is a first type, the second determining unit may be configured to:

divide, based on a valid resource in each slot in the time domain resource, slots included in the time domain resource to obtain M slot portions, where M is an integer greater than or equal to 1, and an absolute value of a difference between valid resources in any two slots included in any one of the M slot portions is less than or equal to a first threshold;

determine the second quantity and the second transmission quantity based on a quantity of slots included in each of the M slot portions and the first transmission quantity; and determine the second code rate based on the first code rate, the first transmission quantity, and the second transmission quantity.

In a possible implementation, that the second determining unit determines the second quantity and the second transmission quantity based on the quantity of slots included in each of the M slot portions and the first transmission quantity includes:

determining, based on the quantity of slots included in each of the M slot portions and the first transmission quantity, that the second quantity and the second transmission quantity meet the following relationships:

$$N_{2,m} = \lceil N_{s,m}/K_1 \rceil, \text{ and}$$

$$K_{2,m,k} = \begin{cases} K_1 & k = 1, \ldots, N_{2,m} - 1 \\ \mathrm{mod}(N_{s,m}, K_1) & k = N_{2,m} \end{cases}$$

$N_{2,m}$ is a quantity of second transport blocks transmitted in an $m^{th}$ slot portion in the M slot portions, $N_{s,m}$ is a quantity of slots included in the $m^{th}$ slot portion, $K_1$ is the first transmission quantity, $K_{2,m,k}$ is a second transmission quantity of a $k^{th}$ second transport block in the second transport blocks transmitted in the $m^{th}$ slot portion, $\lceil \bullet \rceil$ is rounding up, $\mathrm{mod}(\bullet)$ is a modulo operation, and $m=1, \ldots, M$.

In a possible implementation, the second determining unit determines, based on the first code rate, the first transmission quantity, and the second transmission quantity, that a second code rate of a $j^{th}$ second transport block meets the following relationship:

$$C_1 \times K_{2,j}/K_1$$

$C_1$ is the first code rate, $K_1$ is the first transmission quantity, $K_{2,j}$ is a second transmission quantity of the $j^{th}$ second transport block, $j=1, \ldots, N_2$, and $N_2$ is the second quantity.

In a possible implementation, when the mapping type is a second type, the second determining unit may be configured to:

determine the first code rate as the second code rate;

determine the first quantity as the second quantity; and determine the first transmission quantity as the second transmission quantity.

In a possible implementation, the third determining unit may be configured to:

determine a total valid resource based on the time domain resource, where the total valid resource is a resource in a time-frequency resource other than a resource occupied by one or more of a control channel, a synchronization signal block, a reference signal, a random access channel, a reserved resource, and overheads; and the time-frequency resource is a time-frequency resource scheduled for the first data; and determine the valid resource of the second transport block based on the total valid resource, the second quantity, and the second transmission quantity.

In a possible implementation, that the third determining unit determines the valid resource of the second transport block based on the total valid resource, the second quantity, and the second transmission quantity includes:

dividing the total valid resource into valid resources of the second quantity, to obtain the valid resource of the second transport block, where the valid resource is a symbol, a resource element, or a resource block; and dividing the valid resource of the second transport block into valid resources of the second transmission quantity, to obtain a valid resource for each transmission of the second transport block.

In a possible implementation, that the third determining unit determines the valid resource of the second transport block based on the total valid resource, the second quantity, and the second transmission quantity includes:

dividing the total valid resource into valid resources of a first product, to obtain a valid resource for each transmission of the second transport block, where the first product is a product of the second quantity and the second transmission quantity, and the valid resource is a resource element or a resource block.

In a possible implementation, the first quantity and/or the first transmission quantity are/is a power of 2.

In a possible implementation, the sending unit is further configured to:

send control information to a terminal device, where the control information indicates the first configuration, the modulation order, and the first code rate; and send first signaling to the terminal device, where the first signaling indicates a plurality of configurations, and the plurality of configurations include the first configuration.

In a possible implementation, the control information includes a first indication field, the first indication field indicates a correspondence between a redundancy version and n, the first indication field is 1 bit, n represents an $n^{th}$ transmission of the second transport block, n=1, 2, . . . , $N_2$, and $N_2$ is the second quantity.

In a possible implementation, that the sending unit sends the first data to the first device based on the modulation order, the second code rate, and the valid resource of the second transport block includes:

determining a transport block size of the second transport block based on the modulation order, the second code rate, and the valid resource of the second transport block;

encoding the first data based on the transport block size, to obtain the second data; and sending the second data to the first device.

In a possible implementation, a granularity of the time domain resource is one symbol, $2^{\Delta\mu}$ symbols, or a predefined time unit, and $\Delta\mu$ is determined based on a scheduled subcarrier spacing and a reference subcarrier spacing.

According to a sixth aspect, a communication apparatus is provided. The communication apparatus may be a first device, or may be a module (for example, a chip) in a first device. The communication apparatus may include:

a first determining unit, configured to determine a first configuration, a modulation order, and a first code rate, where the first configuration includes a mapping type, a time domain resource, and a first quantity and/or a first transmission quantity, the first quantity is a quantity of first transport blocks, the first transmission quantity is a transmission quantity of the first transport block, and the first code rate is a code rate of the first transport block;

a second determining unit, configured to determine a second code rate, a second quantity, and a second transmission quantity based on the first code rate, the mapping type, and the first quantity and/or the first transmission quantity, where the second code rate is a code rate of a second transport block, the second quantity is a quantity of second transport blocks, and the second transmission quantity is a transmission quantity of the second transport block;

a third determining unit, configured to determine a valid resource of the second transport block based on the time domain resource, the second quantity, and the second transmission quantity;

a receiving unit, configured to receive second data from a second device; and a fourth determining unit, configured to determine first data based on the second data, the modulation order, the second code rate, and the valid resource of the second transport block.

In a possible implementation, when the mapping type is a first type, the second determining unit may be configured to:

divide, based on a valid resource in each slot in the time domain resource, slots included in the time domain resource into M slot portions, where M is an integer greater than or equal to 1, and an absolute value of a difference between valid resources in any two slots included in any one of the M slot portions is less than or equal to a first threshold; and determine the second quantity and the second transmission quantity based on a quantity of slots included in each of the M slot portions and the first transmission quantity; and determine the second code rate based on the first code rate, the first transmission quantity, and the second transmission quantity.

In a possible implementation, that the second determining unit determines the second quantity and the second transmission quantity based on the quantity of slots included in each of the M slot portions and the first transmission quantity includes:

determining, based on the quantity of slots included in each of the M slot portions and the first transmission quantity, that the second quantity and the second transmission quantity meet the following relationships:

$$N_{2,m} = \lceil N_{s,m}/K_1 \rceil, \text{ and}$$

$$K_{2,m,k} = \begin{cases} K_1 & k = 1, \ldots, N_{2,m} - 1 \\ \mathrm{mod}(N_{s,m}, K_1) & k = N_{2,m} \end{cases}$$

$N_{2,m}$ is a quantity of second transport blocks transmitted in an $m^{th}$ slot portion in the M slot portions, $N_{s,m}$ is a quantity of slots included in the $m^{th}$ slot portion, $K_1$ is the first transmission quantity, $K_{2,m,k}$ is a second transmission quantity of a $k^{th}$ second transport block in the second transport blocks transmitted in the $m^{th}$ slot portion, $\lceil \cdot \rceil$ is rounding up, $\mathrm{mod}(\cdot)$ is a modulo operation, and m=1, . . . , M.

In a possible implementation, the second determining unit determines, based on the first code rate, the first transmission quantity, and the second transmission quantity, that a second code rate of a $j^{th}$ second transport block meets the following relationship:

$$C_1 \times K_{2,j}/K_1$$

$C_1$ is the first code rate, $K_1$ is the first transmission quantity, $K_{2,j}$ is a second transmission quantity of the $j^{th}$ second transport block, j=1, . . . , $N_2$, and $N_2$ is the second quantity.

In a possible implementation, when the mapping type is a second type, the second determining unit may be configured to:

determine the first code rate as the second code rate;

determine the first quantity as the second quantity; and determine the first transmission quantity as the second transmission quantity.

In a possible implementation, the third determining unit may be configured to:

determine a total valid resource based on the time domain resource, where the total valid resource is a resource in a time-frequency resource other than a resource occupied by one or more of a control channel, a synchronization signal block, a reference signal, a random access channel, a reserved resource, and overheads; and the time-frequency resource is a time-frequency resource scheduled for the first data; and determine the valid resource of the second transport block based on the total valid resource, the second quantity, and the second transmission quantity.

In a possible implementation, that the third determining unit determines the valid resource of the second transport block based on the total valid resource, the second quantity, and the second transmission quantity includes:

dividing the total valid resource into valid resources of the second quantity, to obtain the valid resource of the second transport block, where the valid resource is a symbol, a resource element, or a resource block; and dividing the valid resource of the second transport block into valid resources of the second transmission quantity, to obtain a valid resource for each transmission of the second transport block.

In a possible implementation, that the third determining unit determines the valid resource of the second transport block based on the total valid resource, the second quantity, and the second transmission quantity includes:

dividing the total valid resource into valid resources of a first product, to obtain a valid resource for each transmission of the second transport block, where the first product is a product of the second quantity and the second transmission quantity, and the valid resource is a resource element or a resource block.

In a possible implementation, the first quantity and/or the first transmission quantity are/is a power of 2.

In a possible implementation, the communication apparatus may further include:

a sending unit, configured to send control information to a terminal device, where the control information indicates the first configuration, the modulation order, and the first code rate.

The sending unit is further configured to send first signaling to the terminal device, where the first signaling indicates a plurality of configurations, and the plurality of configurations include the first configuration.

In a possible implementation, the control information includes a first indication field, the first indication field indicates a correspondence between a redundancy version and n, the first indication field is 1 bit, n represents an $n^{th}$ transmission of the second transport block, n=1, 2, . . . , $N_2$, and $N_2$ is the second quantity.

In a possible implementation, the fourth determining unit may be configured to:

determine a transport block size of the second transport block based on the modulation order, the second code rate, and the valid resource of the second transport block; and decode the second data based on the transport block size, to obtain the first data.

In a possible implementation, a granularity of the time domain resource is one symbol, $2^{\Delta\mu}$ symbols, or a predefined time unit, and $\Delta\mu$ is determined based on a scheduled subcarrier spacing and a reference subcarrier spacing.

According to a seventh aspect, a communication apparatus is provided. The communication apparatus may be a second device, or may be a module (for example, a chip) in a second device. The communication apparatus may include:

a first determining unit, configured to determine a first configuration, a modulation order, and a first code rate, where the first configuration includes information about a first quantity of first transport blocks, the information includes a first transmission quantity and a time domain resource, and the first code rate is a code rate of the first transport block;

a second determining unit, configured to determine a second code rate, a second quantity, and a second transmission quantity based on the first code rate and a first transmission quantity of an $i^{th}$ first transport block, where the second code rate is a code rate of a second transport block corresponding to the $i^{th}$ first transport block, the second quantity is a quantity of second transport blocks corresponding to the $i^{th}$ first transport block, the second transmission quantity is a transmission quantity of the second transport block corresponding to the $i^{th}$ first transport block, i=1, 2, . . . , $N_1$, and $N_1$ is the first quantity;

a third determining unit, configured to determine a valid resource of the second transport block based on a time domain resource of the $i^{th}$ first transport block, the second quantity, and the second transmission quantity; and a sending unit, configured to send second data to a first device based on first data, the modulation order, the second code rate, and the valid resource of the second transport block.

In a possible implementation, the second determining unit may be configured to:

determine the first code rate as the second code rate;

determine that the second quantity is 1; and determine the first transmission quantity of the $i^{th}$ first transport block as the second transmission quantity.

In a possible implementation, the third determining unit may be configured to:

determine a valid resource of the $i^{th}$ first transport block based on the time domain resource of the $i^{th}$ first transport block, where the valid resource is a symbol, a resource element, or a resource block; and divide the valid resource into valid resources of the second transmission quantity, to obtain a valid resource for each transmission of the second transport block.

In a possible implementation, the second determining unit may be configured to:

determine valid resources on different symbols in an $i^{th}$ time domain resource, where the $i^{th}$ time domain resource is the time domain resource of the $i^{th}$ first transport block, and the valid resources are resource elements or resource blocks;

divide, based on the valid resources, the symbols corresponding to the $i^{th}$ time domain resource into $M_i$ symbol portions, where $M_i$ is an integer greater than or equal to 1, and an absolute value of a difference between valid resources on any two symbols included in each of the $M_i$ symbol portions is less than or equal to a second threshold;

determine the second quantity and the second transmission quantity based on a portion quantity $M_i$, a quantity of symbols included in each of the $M_i$ symbol portions, and the first transmission quantity of the $i^{th}$ first transport block; and determine the second code rate based on the first code rate, the first transmission quantity of the $i^{th}$ first transport block, and the second transmission quantity.

In a possible implementation, the first quantity and/or the first transmission quantity are/is a power of 2.

In a possible implementation, the sending unit is further configured to:

send control information to a terminal device, where the control information indicates the first configuration, the modulation order, and the first code rate; and send first signaling to the terminal device, where the first signaling indicates a plurality of configurations, and the plurality of configurations include the first configuration.

In a possible implementation, the control information includes a first indication field, the first indication field indicates a correspondence between a redundancy version and n, the first indication field is 1 bit, n represents an $n^{th}$ transmission of the second transport block, $n=1, 2, \ldots, N_2$, and $N_2$ is the second quantity.

In a possible implementation, that the sending unit sends the first data to the first device based on the modulation order, the second code rate, and the valid resource of the second transport block includes:

determining a transport block size of the second transport block based on the modulation order, the second code rate, and the valid resource of the second transport block;

encoding the first data based on the transport block size, to obtain the second data; and sending the second data to the first device.

In a possible implementation, a granularity of the time domain resource is one symbol, $2^{\Delta\mu}$ symbols, or a predefined time unit, and $\Delta\mu$ is determined based on a scheduled subcarrier spacing and a reference subcarrier spacing.

According to an eighth aspect, a communication apparatus is provided. The communication apparatus may be a first device, or may be a module (for example, a chip) in a first device. The communication apparatus may include:

a first determining unit, configured to determine a first configuration, a modulation order, and a first code rate, where the first configuration includes information about a first quantity of first transport blocks, the information includes a first transmission quantity and a time domain resource, and the first code rate is a code rate of the first transport block;

a second determining unit, configured to determine a second code rate, a second quantity, and a second transmission quantity based on the first code rate and a first transmission quantity of an $i^{th}$ first transport block, where the second code rate is a code rate of a second transport block corresponding to the $i^{th}$ first transport block, the second quantity is a quantity of second transport blocks corresponding to the $i^{th}$ first transport block, the second transmission quantity is a transmission quantity of the second transport block corresponding to the $i^{th}$ first transport block, $i=1, 2, \ldots, N_1$, and $N_1$ is the first quantity;

a third determining unit, configured to determine a valid resource of the second transport block based on a time domain resource of the $i^{th}$ first transport block, the second quantity, and the second transmission quantity; and a receiving unit, configured to receive second data from a second device; and a fourth determining unit, configured to determine first data based on the second data, the modulation order, the second code rate, and the valid resource of the second transport block.

In a possible implementation, the second determining unit may be configured to:

determine the first code rate as the second code rate;

determine that the second quantity is 1; and determine the first transmission quantity of the $i^{th}$ first transport block as the second transmission quantity.

In a possible implementation, the third determining unit may be configured to:

determine a valid resource of the $i^{th}$ first transport block based on the time domain resource of the $i^{th}$ first transport block, where the valid resource is a symbol, a resource element, or a resource block; and divide the valid resource into valid resources of the second transmission quantity, to obtain a valid resource for each transmission of the second transport block.

In a possible implementation, the second determining unit may be configured to:

determine valid resources on different symbols in an $i^{th}$ time domain resource, where the $i^{th}$ time domain resource is the time domain resource of the $i^{th}$ first transport block, and the valid resources are resource elements or resource blocks;

divide, based on the valid resources, the symbols corresponding to the $i^{th}$ time domain resource into $M_i$ symbol portions, where $M_i$ is an integer greater than or equal to 1, and an absolute value of a difference between valid resources on any two symbols included in each of the $M_i$ symbol portions is less than or equal to a second threshold;

determine the second quantity and the second transmission quantity based on a portion quantity $M_i$, a quantity of symbols included in each of the $M_i$ symbol portions, and the first transmission quantity of the $i^{th}$ first transport block; and determine the second code rate based on the first code rate, the first transmission quantity of the $i^{th}$ first transport block, and the second transmission quantity.

In a possible implementation, the first quantity and/or the first transmission quantity are/is a power of 2.

In a possible implementation, the communication apparatus may further include:

a sending unit, configured to send control information to the first device, where the control information indicates the first configuration, the modulation order, and the first code rate.

The sending unit is further configured to send first signaling to the first device, where the first signaling indicates a plurality of configurations, and the plurality of configurations include the first configuration.

In a possible implementation, the control information includes a first indication field, the first indication field indicates a correspondence between a redundancy version and n, the first indication field is 1 bit, n represents an $n^{th}$ transmission of the second transport block, $n=1, 2, \ldots, N_2$, and $N_2$ is the second quantity.

In a possible implementation, the fourth determining unit may be configured to:

determine a transport block size of the second transport block based on the modulation order, the second code rate, and the valid resource of the second transport block; and decode the second data based on the transport block size, to obtain the first data.

In a possible implementation, a granularity of the time domain resource is one symbol, $2^{\Delta\mu}$ symbols, or a predefined time unit, and $\Delta\mu$ is determined based on a scheduled subcarrier spacing and a reference subcarrier spacing.

According to a ninth aspect, a communication apparatus is provided. The communication apparatus may be a second device or a module (for example, a chip) in a second device. The communication apparatus may include a processor, a memory, an input interface, and an output interface. The input interface is configured to receive information from another communication apparatus other than the communication apparatus. The output interface is configured to output information to the another communication apparatus other than the communication apparatus. When the processor executes a computer program stored in the memory, the processor is enabled to perform the communication method provided in any one of the first aspect or the implementations of the first aspect (or any one of the third aspect or the implementations of the third aspect).

According to a tenth aspect, a communication apparatus is provided. The communication apparatus may be a first device or a module (for example, a chip) in a first device. The communication apparatus may include a processor, a memory, an input interface, and an output interface. The input interface is configured to receive information from another communication apparatus other than the communication apparatus. The output interface is configured to output information to the another communication apparatus other than the communication apparatus. When the processor executes a computer program stored in the memory, the processor is enabled to perform the communication method provided in any one of the second aspect or the implementations of the second aspect (or any one of the fourth aspect or the implementations of the fourth aspect).

According to an eleventh aspect, a communication system is provided. The communication system includes the communication apparatus according to the ninth aspect and the communication apparatus according to the tenth aspect.

According to a twelfth aspect, a computer-readable storage medium is provided. The computer-readable storage medium stores a computer program or computer instructions. When the computer program or the computer instructions is/are run, the communication method provided in any one of the foregoing aspects is implemented.

According to a thirteenth aspect, a chip is provided. The chip includes a processor, configured to execute a program stored in a memory. When the program is executed, the chip is enabled to perform the foregoing method.

In a possible implementation, the memory is located outside the chip.

According to a fourteenth aspect, a computer program product is provided. The computer program product includes computer program code. When the computer program code is run, the foregoing communication method is performed.

DETAILED DESCRIPTION OF THE EMBODIMENTS

The embodiments may include a communication method and apparatus, and a computer-readable storage medium, to reduce resources. Details are separately described in the following.

For better understanding of the embodiments, the following first describes related technologies.

A high frequency band is a frequency band above 6 GHz, and may include 28 GHz, 39 GHz, 60 GHz, 73 GHz, and the like. To meet increasing communication requirements, the high frequency band becomes a research and development hotspot in the industry due to abundant spectrum resources of the high frequency band. A bandwidth of a valid resource in a spectrum of 52.6 GHz to 71 GHz in the high frequency band is large. To make full use of the spectrum resource and improve a peak rate or a throughput, a bandwidth occupied by a single carrier may be increased from 400 MHz in a current new radio (NR) system to about 2 GHz or higher. Due to a limitation of hardware and the like of a terminal device and a higher requirement on a data demodulation delay, a maximum quantity of fast Fourier transform (FFT) points and a maximum quantity of resource blocks are limited. A larger quantity of FFT points indicates higher complexity. When a quantity of FFT points is fixed, a larger subcarrier spacing indicates a wider supported bandwidth. For example, when the maximum quantity of FFT points is 4096 and the maximum quantity of resource blocks is 275, a supported bandwidth is 400 MHz when a subcarrier spacing is 120 kHz, a supported bandwidth is 800 MHz when a subcarrier spacing is 240 kHz, a supported bandwidth is 1600 MHz when a subcarrier spacing is 480 kHz, and a supported bandwidth is 3200 MHz when a subcarrier spacing is 960 kHz.

In the wireless communication system, scheduling of a shared channel, a detection periodicity of a control channel, a hybrid automatic repeat request (HARQ) process, and the like are all related to the subcarrier spacing. A scheduling unit of the shared channel in time domain is a slot or a mini-slot. Duration of the slot is determined by the subcarrier spacing. A larger subcarrier spacing indicates shorter duration of the slot. A slot may include 14 symbols, and a mini-slot may include 2 to 13 symbols. The symbol may be an orthogonal frequency division multiplexing (OFDM) symbol or may be another symbol. This is not limited herein.

Figure 1:
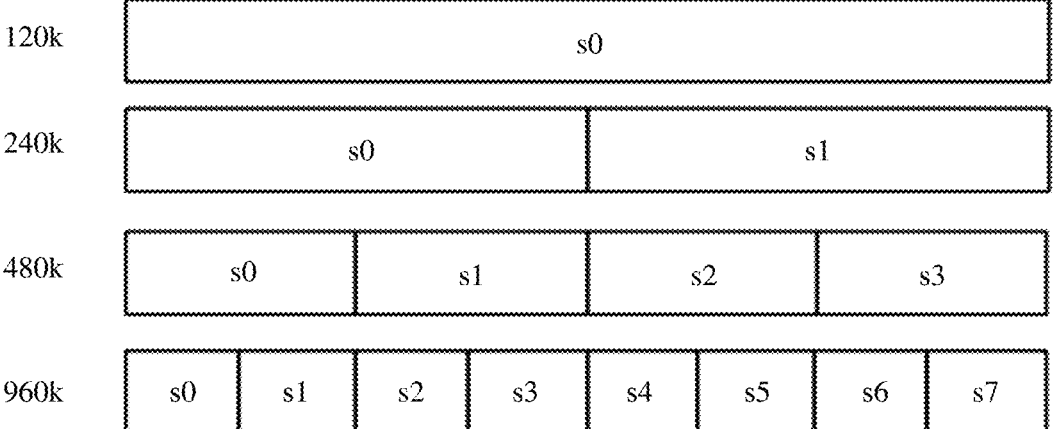
FIG. 1 is a schematic diagram of slot spacings of different subcarrier spacings according to an embodiment.

FIG. 1 is a schematic diagram of slots in unit duration in different subcarrier spacings according to an embodiment. One rectangular frame represents one slot. As shown in FIG. 1, for same duration, quantities of slots included in the duration are different in different subcarrier spacings. For example, the duration is equal to a slot whose subcarrier spacing is 120 kHz. When the subcarrier spacing is 240 kHz, the duration may include two slots. When the subcarrier spacing is 480 kHz, the duration may include four slots. When the subcarrier spacing is 960 kHz, the duration may include eight slots. A detection frequency of the control channel is also a slot. It can be understood that when the (PUSCH) scheduling and DCI formats 1-1 and 1-2 for physical downlink shared channel (PDSCH) scheduling are separately described.

Figure 2:
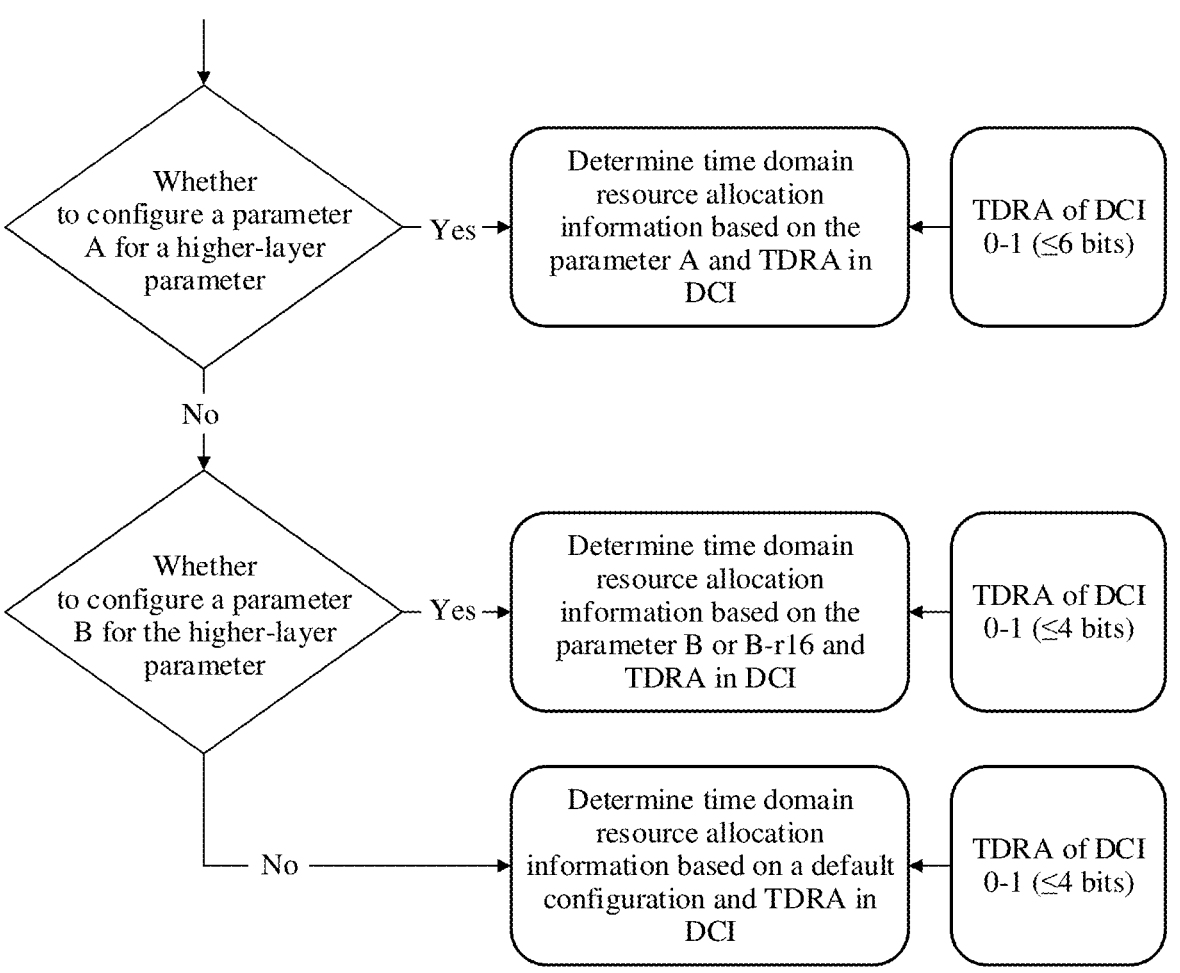
FIG. 2 is a schematic flowchart of a method for determining time domain resource allocation information for scheduling a PUSCH in a DCI format 0-1 according to an embodiment.

The following uses the DCI format 0-1 as an example for description. FIG. 2 is a schematic flowchart of a method for determining time domain resource allocation information for scheduling a PUSCH in the DCI format 0-1 according to an embodiment. As shown in FIG. 2, a used parameter may be a parameter A or a parameter B.

The parameter A is PUSCH-TimeDomainResourceAllocationList-ForDCIformat0_1. Configuration information of the parameter A is given by a higher-layer parameter PUSCH-TimeDomainResourceAllocationList-r16, and the corresponding configuration information is as follows:

```
PUSCH-TimeDomainResourceAllocationList-
r16::=SEQUENCE(SIZE(1..maxNrofUL-Allocations-r16)) OF PUSCH-
TimeDomainResourceAllocation)
    PUSCH-TimeDomainResourceAllocation-r16 ::= SEQUENCE {
        k2-r16                              INTEGER(0..32)
        PUSCH-Allocation-r16               SIZE(1..maxNrofMultiplePUSCHs-r16)) OF
PUSCH-Allocation-r16,
        ...
    }
    PUSCH-Allocation-r16 ::=SEQUENCE {
        mappingType-r16                    ENUMERATED {typeA, typeB}
        startsymbolAndLength-r16           INTEGER (0..127)
        startsymbol-r16                    INTEGER(0..13)
        length-r16                         INTEGER(1..14)
        numberofRepetitions-r16            ENUMERATED {n1, n2, n3, n4, n7, n8, n12,
n16}
        ...
    }
``` subcarrier spacing is increased from 120 kHz in an existing NR system to 480 kHz or 960 kHz, a slot time corresponding to 480 kHz or 960 kHz is shortened to ¼ or ⅛ of a slot time of 120 kHz. If the control channel is still detected in a unit of a slot, a huge challenge is imposed to a processing capability of the terminal device.

To resolve the problem, multi-slot scheduling may be performed. Correspondingly, both the shared channel and the control channel are scheduled in a unit of a plurality of slots in terms of time. Therefore, the terminal device may detect the control channel once in the plurality of slots, to reduce control channel detection complexity and power consumption. When joint scheduling is performed in the plurality of slots, how to determine a quantity of transport blocks in the plurality of slots and how to map the transport blocks become problems to be resolved.

In an implementation of NR, two transport block mapping methods for multi-slot scheduling are defined. One is transmitting a same transport block for a plurality of times in a plurality of slots, and the other is transmitting a plurality of transport blocks in a plurality of slots. In the two methods, a same transport block has different redundancy versions in a plurality of transmissions, and a receive end may combine and demodulate a plurality of redundancy versions of the same transport block, to enhance coverage.

To better understand the mapping method and the transmission method, indications about time domain resource allocation in a downlink control information (DCI) format for multi-slot scheduling may be first described. DCI formats 0-1 and 0-2 for physical uplink shared channel The parameter A may include M1 configurations, and each configuration includes an offset value k2 of a PUSCH transmission and a PUSCH scheduling list (such as puschAllocationList-r16). A maximum value of M1 is 64 and a minimum value is 1. A configuration in the M1 configurations that is used to determine information such as time domain resource allocation of a current PUSCH transmission is indicated by time domain resource allocation (TDRA) of DCI. Therefore, a quantity of bits in TDRA in the DCI format 0-1 is $\lceil \log 2(M1) \rceil$. $\lceil \bullet \rceil$ is rounding up. The PUSCH scheduling list includes S pieces of scheduling information (such as PUSCH-Allocation-r16). A maximum value of S is 8, and one piece of scheduling information corresponds to one PUSCH transport block. In other words, S is a quantity of transport blocks in multi-slot scheduling. Each piece of scheduling information may include one or more of a mapping type, a start and length indicator value (start and length indicator value, SLIV) (startSymbolAndLength-r16), a start symbol index S (startSymbol-r16), a duration length L (length-r16), and a quantity of repetitions K (numberOfRepetitions-r16) of the PUSCH. r16 represents the 5th generation (5G) mobile communication technology release 16 (R16).

The parameter B is pusch-TimeDomainAllocationList. Configuration information of the parameter B is given by a higher-layer parameter PUSCH-TimeDomainResourceAllocationList, and the corresponding configuration information is as follows:

```
PUSCH-TimeDomainResourceAllocationList::=SEQUENCE(SIZE(1..maxNrofUL-
Allocations)) OF PUSCH-TimeDomainResourceAllocation)
    PUSCH-TimeDomainResourceAllocation :: = SEQUENCE {
        k2                          INTEGER(0..32)
        mappingType-r16             ENUMERATED {typeA, typeB}
        startsymbolAndLength-r16    INTEGER (0..127)
        ...
    }
}
```

The parameter B may include M2 configurations, and each configuration includes an offset value k2 of a PUSCH transmission, a mapping type of the PUSCH, and time domain resource allocation information SLIV (such as start-SymbolAndLength) of the PUSCH. A maximum value of M2 is 16 and a minimum value is 1. A configuration in the M2 configurations that is used to determine time domain resource allocation information of a current PUSCH transmission is indicated by TDRA of DCI. Therefore, a quantity of bits in the TDRA in the DCI is $\lceil \log 2(M2) \rceil$. When a plurality of slots may be scheduled based on the parameter B, only a transport block of one PUSCH is transmitted in the plurality of slots, and the transport block is repeatedly transmitted in the plurality of slots. A transmission quantity of the transport block may alternatively be indicated by an aggregation factor (pusch-AggregationFactor).

It can be understood that when the parameter A is configured, S transport blocks may be transmitted in multi-slot scheduling, and a time domain resource location and a transmission quantity of each transport block may be independently configured. When the parameter B is configured, only one transport block can be transmitted in multi-slot scheduling, and the transport block may be repeatedly sent.

When a plurality of transport blocks can be transmitted, a modulation and coding scheme (MCS) of each transport block is the same, and each transport block has an independent new data indicator bit and an independent redundancy version indicator bit in the DCI format. A quantity of bits of the redundancy version indicator bit of each transport block is 1. A relationship between a value of the redundancy version indicator bit and an indicated redundancy version number may be shown in Table 1.

TABLE 1

| Value of the redundancy version indicator bit | Value of the redundancy version number |
|---|---|
| 0 | 0 |
| 1 | 2 |

Figure 3:
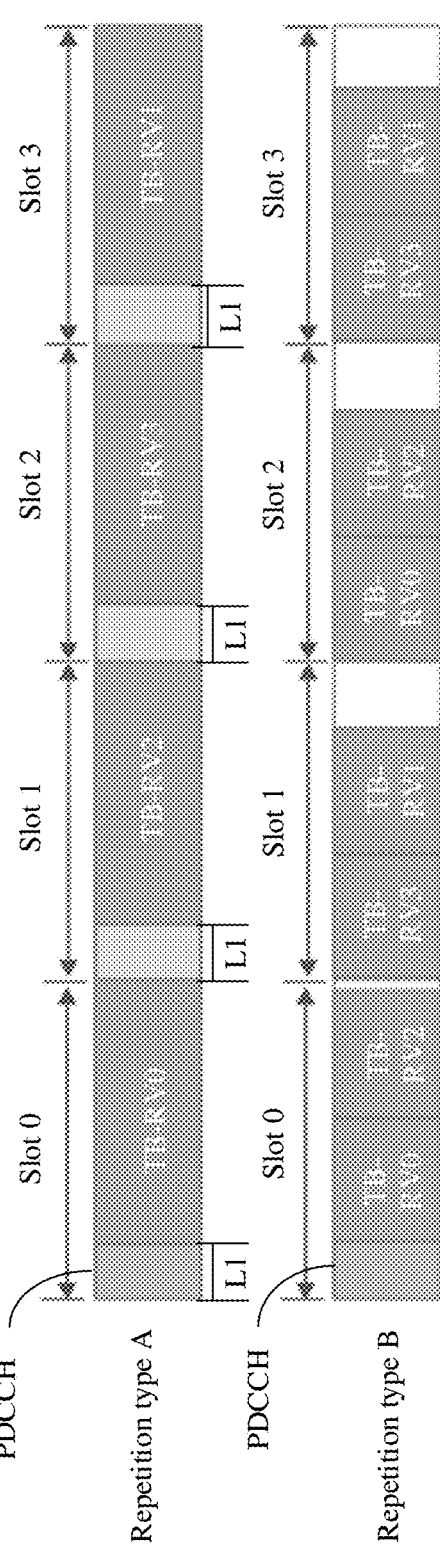
FIG. 3 is a schematic diagram of mapping during repeated transmission of a TB according to an embodiment.

A time domain resource indicated by the SLIV or S (start point) and L (length) in the configuration information is a time domain resource occupied by a transport block in a first transmission. When a transport block needs to be transmitted for a plurality of times, there are two methods for determining a time domain resource occupied by an $i^{th}$ (i=2, . . . , K) transmission. FIG. 3 is a schematic diagram of mapping during repeated transmission of a transport block (TB) according to an embodiment. As shown in FIG. 3, for a repetition type A, a same transport block is repeatedly transmitted on a PUSCH in K consecutive slots. A time domain resource used to transmit the PUSCH in each slot is the same as a time domain resource used to transmit the PUSCH in a first slot. In other words, the time domain resource used to transmit the PUSCH in each slot is the same as the time domain resource indicated by the SLIV. The repetition type A is applicable to mapping of a normal slot and a mini-slot. As shown in FIG. 3, for a repetition type B, resources occupied by PUSCHs that are transmitted for a plurality of times are consecutive in terms of time (except a time domain symbol that cannot be used for PUSCH mapping). Repetition type B is applicable only to mapping of the mini-slot.

Downlink multi-slot scheduling (such as PDSCH multi-slot scheduling) supports only a plurality of transmissions of a same transport block. A quantity K of transmissions in a plurality of slots is configured by using a high-layer parameter pdsch-AggregationFactor. In addition, a PDSCH transport block supports only the repetition type A. In other words, different redundancy versions of a same transport block are transmitted in K consecutive slots. Time-domain resource configurations in all the slots are the same and are indicated by the SLIV.

A plurality of transmissions of a transport block in the multi-slot scheduling method may correspond to two time domain resource allocation manners based on different repetition types. For the repetition type A, time domain resource allocation in the K slots is the same. In addition, because configuration information of the transport block needs to be detected only once, a symbol corresponding to a physical downlink control channel (physical downlink control channel, PDCCH) in a first slot in last K−1 slots is wasted. As shown in FIG. 3, first L1 symbols in a slot 0 (such as the first slot) of the repetition type A are used to transmit the PDCCH, and the PDCCH carries DCI of the configuration information of the transport block. To ensure that time domain resources used by a TB-RV0 to a TB-RV3 are the same, first L1 symbols that are in a slot 1 (such as a second slot) to a slot 3 (such as a fourth slot) and that have a same length as the symbols used to transmit the PDCCH in the slot 0 are vacant. For the repetition type B, time-frequency resources for a plurality of transmissions are consecutive in a slot, but one transmission of a same transport block cannot cross slots. Therefore, when remaining time domain resources (time domain symbols) in a slot are insufficient for transmitting the transport block once, the time domain resources (time domain symbols) are vacant. As shown in FIG. 3, a last blank part in the slot 0 to the slot 3 in the repetition type B is a resource that is not used to transmit information. It can be understood that some time domain resources in the slot 0 to the slot 3 are vacant because the time domain resources are insufficient for transmitting the transport block once. It can be understood that some resources are wasted in both repetition types.

In addition, in the repetition type B, a transport block is not repeatedly mapped based on a slot. Because available frequency domain resources may be different between different symbols in a same slot, for example, only some symbols have a phase tracking reference signal (PTRS), and some symbols have a channel state information-reference signal (CSI-RS), different available frequency domain resources between different symbols may cause a difference in valid code rates of different redundancy versions that are actually transmitted. This increases complexity of combining different redundancy versions at a receive end, and even reduces decoding performance.

Figure 4:
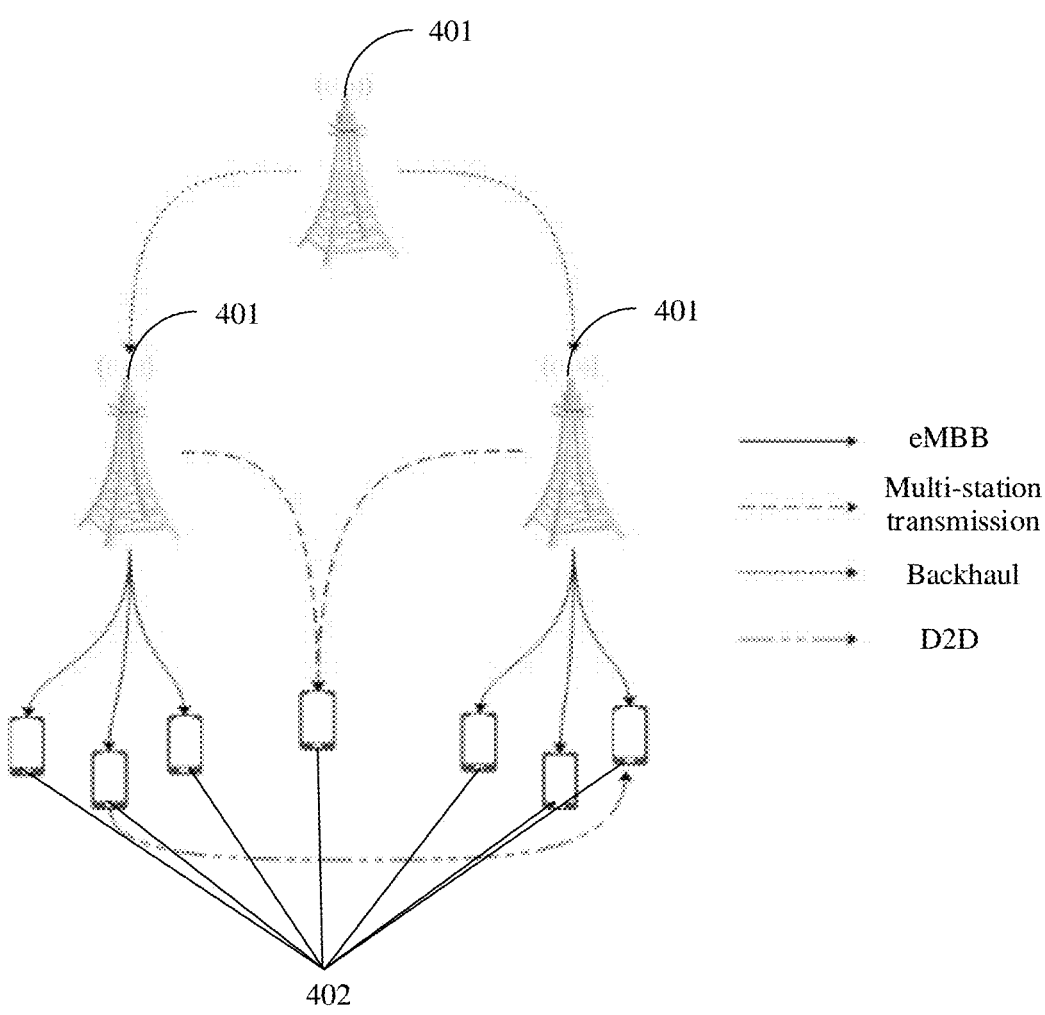
FIG. 4 is a schematic diagram of a network architecture according to an embodiment.

To better understand a communication method and apparatus, and a computer-readable storage medium provided in embodiments, the following first describes a network architecture used in embodiments. FIG. 4 is a schematic diagram of a network architecture according to an embodiment. As shown in FIG. 4, the network architecture may include access network devices 401 and terminal devices 402. The access network device 401 may transmit an enhanced mobile broadband (eMBB) service with the terminal device 402 or may transmit another service. This is not limited herein. Backhaul may be performed between the access network device 401 and the access network device 401. A plurality of access network devices 401 may simultaneously communicate with one terminal device 402. This may also be referred to as multi-station transmission. Device-to-device (D2D) communication may be performed between the terminal device 402 and the terminal device 402.

The access network device may be a device that can communicate with the terminal device and may also be referred to as a network device. The access network device may be a base station, a relay station, or an access point. The base station may be a base transceiver station (BTS) in a global system for mobile communications (GSM) or a code division multiple access (CDMA) network, or may be a node (NB) in wideband code division multiple access (WCDMA), or may be an evolved NB (eNB) or (eNodeB) in long term evolution (LTE). The access network device may alternatively be a radio controller in a cloud radio access network (CRAN) scenario. The access network device may alternatively be an access network device in a future network or a network device in a future evolved public land mobile network (PLMN). The access network device may alternatively be a wearable device or a vehicle-mounted device.

The terminal device may also be referred to as user equipment (UE), a mobile station (MS), a mobile terminal (MT), or the like, and is a device that provides voice and/or data connectivity to a user. The terminal device may be a handheld terminal, a notebook computer, a subscriber unit, a cellular phone, a smart phone, a wireless data card, a personal digital assistant (PDA) computer, a tablet computer, a wireless modem, a handheld device, a laptop computer, a cordless phone, or a wireless local loop (WLL) station, a machine type communication (MTC) terminal, a wearable device (for example, a smartwatch, a smartband, or a pedometer), a vehicle-mounted device (for example, on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an uncrewed aerial vehicle, or an aircraft), or another device that can access a network.

For example, the embodiments may be applicable to a scenario in which a delay requirement is high or a transmission rate requirement is high, such as multi-station transmission, backhaul, wireless to the x (WTTx), enhanced mobile broadband (eMBB), or device-to-device (D2D).

For example, the network architecture may be applied to a cyclic prefix (CP)-OFDM-based system or may be applied to a discrete Fourier transform-spread-OFDM (DFT-s-OFDM) system. The network architecture may further be applied to another system. This is not limited herein.

All names are merely used as examples. In future communication, for example, in a 6G communication system, the names may alternatively be referred to as other names. Alternatively, in future communication, for example, in a 6G communication system, a network element may be replaced with another entity, device, or the like that has a same function. This is not limited. Unified descriptions are provided herein, and details are not described below again.

It should be noted that the network architecture shown in FIG. 4 does not constitute a limitation on the method. Optionally, the method in the embodiments may be further applicable to various future communication systems.

Figure 5:
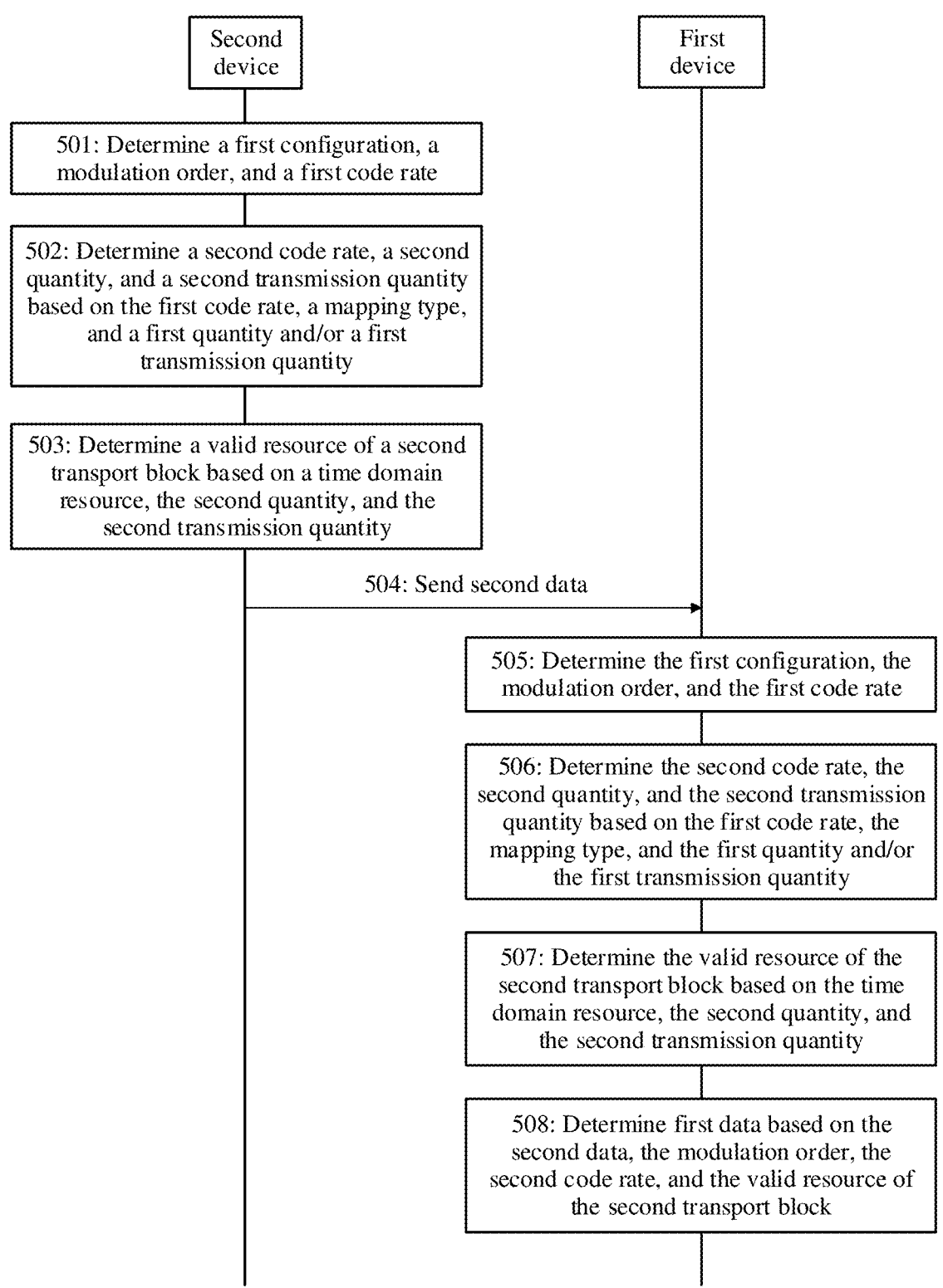
FIG. 5 is a schematic flowchart of a communication method according to an embodiment.

Based on the network architecture, FIG. 5 is a schematic flowchart of a communication method according to an embodiment. As shown in FIG. 5, the communication method may include the following steps.

501: A second device determines a first configuration, a modulation order, and a first code rate.

When the second device needs to send first data to a first device, the second device may determine the first configuration, the modulation order, and the first code rate. The first configuration may include a mapping type, a time domain resource, and a first quantity and/or a second quantity. The mapping type may include a first type and a second type. In the first type, mapping is performed based on a slot. One slot may be used to transmit one transport block once, and one slot may include 14 symbols. In the second type, mapping is performed based on a mini-slot. One transport block may be transmitted once in a minimum unit of a symbol, and one mini-slot may include 1 to 13 symbols. The transport block herein is a finally transmitted transport block, such as a second transport block below. The time domain resource is a total time domain resource used to transmit the first data in one or more slots. The first quantity is a quantity of first transport blocks, such as an indicated quantity of transport blocks. A first transmission quantity is a transmission quantity of the first transport block, such as an indicated transmission quantity. A transmission quantity corresponding to each first transport block is the first transmission quantity. The first code rate is a code rate of the first transport block, the modulation order is an order used during quadrature amplitude modulation (QAM), and the indicated first code rate and the indicated modulation order may be considered as partial configuration information of each first transport block. The first transport block is a configured transport block, and the second transport block is a transmitted transport block.

When the second device is an access network device, the second device may configure, for a terminal device, a configuration list used to transmit data. The configuration list may include information about a plurality of configurations, and the plurality of configurations may include the first configuration. Information about a configuration may be an index of the configuration or may be other information that can uniquely distinguish between different configurations. Configuration lists of different terminal devices may be the same or may be different. When the configuration lists of different terminal devices are different, the second device needs to establish a correspondence between the configuration lists and the terminal devices. The correspondence between the configuration lists and the terminal devices may be shown in Table 2.

TABLE 2

| Terminal device | Configuration list |
|---|---|
| Terminal device 1 | Configuration list 1 |
| Terminal device 2 | Configuration list 2 |
| . . . | . . . |

The terminal device 1 and the terminal device 2 may be identifiers of the terminal devices or may be other information that can be used to uniquely identify the terminal devices. The configuration list 1 and the configuration list 2 may be indexes of the configuration lists or may be other information that can be used to uniquely distinguish between different configuration lists. In other words, the configuration list may be user equipment (UE)-specific.

Then, the second device may send the corresponding configuration list to the first device (such as the terminal device) through higher layer signaling. The higher layer signaling may be radio resource control (RRC) signaling or may be media access control (MAC) signaling or may be other higher layer signaling. This is not limited herein.

To implement/support a flexible transport block configuration in scheduling of a plurality of PDSCHs, an indication field of the first quantity may be added to a parameter configuration of the higher layer signaling, or an indication field of the first transmission quantity may be added to a parameter configuration of the higher layer signaling, or indication fields of the first quantity and the first transmission quantity may be added to a parameter configuration of the higher layer signaling. When the higher layer signaling is the RRC signaling, a configuration list for an RRC signaling transmission may be PDSCH-TimeDomainResourceAllocationList, and PDSCH-TimeDomainResourceAllocationList is an information element (information element, IE) in the RRC signaling. An example in which the information element may include the indication fields of the first quantity and the first transmission quantity is as follows (another scenario may be simply deduced by analogy):

6, or T0+log 2(SCS1/SCS0). T0 is an initial value of T, SCS1 indicates a scheduled subcarrier spacing of a PDSCH, SCS0 indicates a reference subcarrier spacing, and log 2(x) indicates a logarithm of 2 for x. When the mapping type is the first type, the first quantity may be further limited to min $\{2^s, N_s\}$. $N_s$ is a quantity of slots for multi-slot scheduling. For example, it is assumed that the quantity of slots for multi-slot scheduling is 4. In this case, a value of the first quantity may be $\{1, 2, 4\}$. It is assumed that the quantity of slots for multi-slot scheduling is 8. In this case, a value of the first quantity may be $\{1, 2, 4, 8\}$. When the mapping type is the second type, a value range of the indication field may be limited to an integer from 1 to T. A configuration in the configuration list may be PDSCH-TimeDomainResourceAllocation or PDSCH-TimeDomainResourceAllocation-r17. The configuration list indicates that the indication field of the first quantity may be added to the 5G release 16 (R16) (such as PDSCH-TimeDomainResourceAllocationList), or that the indication field of the first quantity may be defined in a new future 5G standard release (that is, similar to PDSCH-TimeDomainResourceAllocationList-r17). The configuration list may alternatively use another name in a future standard.

As shown in the configuration list, the indication field of the first transmission quantity, for example, repetitionNumber, is further added or extended. The indication field indicates the transmission quantity of each first transport block in multi-slot scheduling, that is, the first transmission quantity is the transmission quantity of each first transport block. In other words, the transmission quantities of all the first transport blocks are the same. When the mapping type is the first type, such as a type of mapping based on a slot, the value range of the indication field may be limited to $2^Q$, and Q is an integer that meets $0 \le Q \le P$. P may be 3, 4, 5, 6, or P0+log 2(SCS1/SCS0). P0 is an initial value of P. If the quantity of slots in multi-slot scheduling is a power of 2, when a mapping type of the PDSCH is the first type, the first quantity is also a power of 2. When the mapping type is the

```
PDSCH-TimeDomainResourceAllocationList::=SEQUENCE (SIZE(1..maxNrofDL-
Allocations)) OF PDSCH-TimeDomainResourceAllocation
    PDSCH-TimeDomainResourceAllocation::= SEQUENCE {
       k0                                INTEGER(0..32)
    OPTIONAL,
       mappingType                       ENUMERATED {typeA, typeB},
       startSymbolAndLength              INTEGER (0.. maxSLIV)
       numberofPDSCH                     INTEGER (1,2,...,maxNofPDSCH)
       repetitionNumber                  INTEGER
(1,2, ... ,maxNofRepeat4PDSCH)
    }
    PDSCH-TimeDomainResourceAllocationList-r17 ::= SEQUENCE
    (SIZE(1..maxNrofDL-Allocations)) OF PDSCH-TimeDomainResourceAllocation-r17
    PDSCH-TimeDomainResourceAllocation-r17 ::= SEQUENCE {
       k0-r17                            INTEGER(0..32)
    OPTIONAL,
       mappingType-r17                   ENUMERATED {typeA, typeB},
       startSymbolAndLength-r17          INTEGER (0..maxSLIV-r17),
       numberofPDSCH-r17                 INTEGER (1,2,...,maxNofPDSCH-r17)
       repetitionNumber-r17          ENUMERATED {n2, n3, n4, n5, n6, n7, n8,
n16,n17,n18,...,n64}         OPTIONAL,
       ...
    }
```

As shown in the configuration list, the indication field of the first quantity, for example, numberofPDSCH, is added to the information element. A value range of the indication field may be limited to $2^s$, and s is an integer that meets $0 \le s \le T$. In other words, a maximum quantity of transport blocks that can be scheduled is maxNofPDSCH=$2^T$. T may be 3, 4, 5, second type, the value range of the indication field may be limited to an integer from 1 to P. In another implementation, the first transmission quantity may alternatively be indicated by an aggregation factor, and the indication field of the first transmission quantity may alternatively be a higher-layer parameter aggregation factor pdsch-AggregationFactor. In other words, the transmission quantity of the first transport block may be indicated by pdsch-AggregationFactor. Alternatively, the indication field of the first transmission quantity may be a higher-layer parameter pdsch-AggregationFactor-r17. In other words, the transmission quantity of the first transport block may be indicated by pdsch-AggregationFactor-r17. When the information element includes the indication field of the first transmission quantity and the aggregation factor, the transmission quantity of the first transport block is indicated by the indication field of the first transmission quantity. When the information element includes only the aggregation factor and does not include the indication field of the first transmission quantity, the transmission quantity of the first transport block is indicated by the aggregation factor.

It should be understood that when the quantity of slots included in multi-slot scheduling may be determined by using another parameter or in another manner, the configuration list may include the indication field of the first quantity or may include the indication field of the first transmission quantity. Then, the first transmission quantity (or the first quantity) may be determined based on a relationship between the first quantity (or the first transmission quantity) and the quantity of slots included in multi-slot scheduling. For example, a relationship between the first quantity, the first transmission quantity, and the quantity of slots included in multi-slot scheduling may be the first quantity×the first transmission quantity=the quantity of slots included in multi-slot scheduling. For example, when a correspondence between the subcarrier spacing and the quantity of slots included in multi-slot scheduling is configured or configured by default, the quantity of slots included in multi-slot scheduling may be determined based on the scheduled subcarrier spacing of the PDSCH.

When the quantity of slots included in multi-slot scheduling cannot be determined by using another parameter or in another manner, the configuration information may include the indication field of the first quantity and the indication field of the first transmission quantity. Then, the quantity of slots included in multi-slot scheduling may be determined based on a relationship between the first quantity, the first transmission quantity, and the quantity of slots included in multi-slot scheduling. For example, the relationship between the first quantity, the first transmission quantity, and the quantity of slots included in multi-slot scheduling may be the first quantity×the first transmission quantity=the quantity of slots included in multi-slot scheduling.

As shown in the configuration list, the configuration may further include an SLIV (such as startSymbolAndLength or startSymbolAndLength-r17). The SLIV indicates the time domain resource. During multi-slot scheduling, an indication range of the SLIV may be adjusted. For example, during single-slot scheduling, a maximum value range of S corresponding to an SLIV indication is 0 to 13, and a maximum value range of L corresponding to the SLIV indication is 1 to 14. When the quantity of slots for multi-slot scheduling is 4, a maximum value range of S corresponding to an SLIV indication is 0 to 14×a−1, and a maximum value range of L corresponding to the SLIV indication is 1 to 14×a, where a=log 2(SCS1/SCS0). The SCS1 indicates the subcarrier spacing scheduled for the PDSCH, and the SCS0 indicates the reference subcarrier spacing. For example, it is assumed that the SCS1=480 kHz, the SCS0=120 kHz, and a=4. In this method, a granularity, a unit, or a step (such as a quantity of symbols added when a value of S or L is incremented by 1) of each of S and L is still one symbol.

For example, when the scheduled subcarrier spacing of the PDSCH is 480 kHz, a relationship between the mapping type and S and/or L may be shown in Table 3 or Table 4.

TABLE 3

| | Normal cyclic prefix (normal cyclic prefix) | | |
|---|---|---|---|
| Mapping type | S | L | S + L |
| First type | {0, 1, . . . , 12} | {12, . . . , 56} | {12, . . . , 56} |
| Second type | {0, . . . , 48} | {8, . . . , 52} | {8, . . . , 56} |

TABLE 4

| | Normal cyclic prefix (normal cyclic prefix) | | |
|---|---|---|---|
| Mapping type | S | L | S + L |
| First type | {0, 4, 8, 12} | {12, 16, 20, . . . , 56} | {12, 16, 20, . . . , 56} |
| Second type | {0, 4, 8, . . . , 48} | {8, 12, 16, . . . , 52} | {8, 12, 16, . . . , 56} |

Values under S, L, and S+L are corresponding value ranges. As shown in Table 3, when the mapping type is the first type, a value range of S is 0 to 12, a value range of L is 12 to 56, and a value range of S+L is 12 to 56. When the mapping type is the second type, a value range of S is 0 to 48, a value range of L is 8 to 52, and a value range of S+L is 8 to 56. It can be understood that values of S, L, and S+L corresponding to Table 3 may be consecutive. As shown in Table 4, when the mapping type is the first type, a value of S may be 0, 4, 8, or 12, a value of L may be 12, 16, 20, . . . , or 56, and a value of S+L may be 12, 16, 20, . . . , or 56. When the mapping type is the second type, a value of S may be 0, 4, 8, . . . , or 48, a value of L may be 8, 12, 16, . . . , or 52, and a value of S+L may be 8, 12, 16, . . . , or 56. It can be understood that values of S, L, and S+L corresponding to Table 4 can be obtained only at an interval of four symbols, and cannot be obtained consecutively. When the scheduled subcarrier spacing of the PDSCH is 960 kHz, a relationship between the mapping type and S and/or L may be shown in Table 5 or Table 6.

TABLE 5

| | Normal cyclic prefix (normal cyclic prefix) | | |
|---|---|---|---|
| Mapping type | S | L | S + L |
| First type | {0, 1, . . . , 24} | {24, . . . , 112} | {24, . . . , 112} |
| Second type | {0, . . . , 96} | {16, . . . , 104} | {16, . . . , 112} |

TABLE 6

| | Normal cyclic prefix (normal cyclic prefix) | | |
|---|---|---|---|
| Mapping type | S | L | S + L |
| First type | {0, 8, 16, 24} | {24, 32, 40, . . . , 112} | {24, 32, 40, . . . , 112} |
| Second type | {0, 8, 16, . . . , 96} | {16, 24, 32, . . . , 104} | {16, 24, 32, . . . , 112} |

As shown in Table 5, when the mapping type is the first type, a value range of S is 0 to 24, a value range of L is 24 to 112, and a value range of S+L is 24 to 112. When the mapping type is the second type, a value range of S is 0 to 96, a value range of L is 16 to 104, and a value range of S+L is 16 to 112. It can be understood that values of S, L, and S+L corresponding to Table 5 may be consecutive. As shown in Table 6, when the mapping type is the first type, a value of S may be 0, 8, 16, or 24, a value of L may be 24, 32, 40, . . . , or 112, and a value of S+L may be 24, 32, 40, . . . , or 112. When the mapping type is the second type, a value of S may be 0, 8, 16, . . . , or 96, a value of L may be 16, 24, 32, . . . , or 104, and a value of S+L may be 16, 24, 32, . . . , or 112. It can be understood that values of S, L, and S+L corresponding to Table 6 can be obtained only at an interval of eight symbols and cannot be obtained consecutively.

During multi-slot scheduling, a definition or meaning of the SLIV may also be adjusted. For example, regardless of single-slot scheduling or multi-slot scheduling, a value range of S corresponding to the SLIV indication is 0 to 13, and a value range of L corresponding to the SLIV indication is 1 to 14. However, granularities, units, or steps corresponding to S and L in single-slot scheduling and multi-slot scheduling are different. A granularity of single-slot scheduling is a symbol, and a granularity of multi-slot scheduling is a symbols. For example, during single-slot scheduling, S=0 indicates that a time domain resource start location is a symbol 0 (corresponding to a first symbol), and L=5 indicates that a time domain resource length is five symbols, that is, a symbol 0 to a symbol 4 are indicated time domain resource locations. S=13 indicates that a time domain resource start location is a symbol 13 (corresponding to a fourteenth symbol), and L=1 indicates that a time domain resource length is one symbol, that is, a symbol 13 is an indicated time domain resource location. During multi-slot scheduling, S=0 indicates that a time domain resource start location is a symbol 0 (such as 0×a), and L=5 indicates that a time domain resource length is 5×a symbols, that is, a symbol 0 to a symbol 5×a−1 may be indicated time domain resource locations. S=13 indicates that a time domain resource start location is a symbol 52=13×a (corresponding to a 13×a+1 symbol), and L=1 indicates that a time domain resource length is 1×a symbols, that is, a symbol 13×a to a symbol 14×a−1 are indicated time domain resource locations.

For example, when the reference subcarrier spacing is 120 kHz, S=2 indicates that a start point of a shared channel is a third symbol (symbol numbers start from 0). When the subcarrier spacing is 480 kHz, S=2 indicates that a start point of a shared channel is a ninth symbol. When the subcarrier spacing is 960 kHz, S=2 indicates that a start point of a shared channel is a seventeenth symbol. For example, when the reference subcarrier spacing is 120 kHz, L=4 indicates that a length of the shared channel is four symbols corresponding to 120 kHz, sixteen symbols corresponding to 480 kHz, and thirty-two symbols corresponding to 960 kHz.

During multi-slot scheduling, an indication manner of the SLIV may be further adjusted. In different implementations, S may be separately indicated, or L may be separately indicated, or S and L may be indicated. When S or L is separately indicated, if a sum of S and L is specified as a given value, L (or S) may be determined based on S (or L) and the given value.

It can be understood from the foregoing descriptions that, a scheduled time domain resource in a plurality of slots, such as a time domain resource used to transmit the shared channel, or a time domain resource used to transmit data, may be determined based on the SLIV in the configuration list.

As shown in the configuration list, the configuration list may further include a mapping type indication field map-pingType and/or an indication field of an offset value k0 (or K0). The mapping type indication field indicates a mapping type, and the mapping type may be the first type or the second type. The offset value indication field indicates a quantity of slots in an interval between a start moment of a slot that carries a control channel and a start moment of a first slot in a plurality of slots that carries a share channel scheduled by the control channel, or indicates a quantity of slots in an interval between a start moment of a first slot in a plurality of slots that carries a control channel and a start moment of a first slot in a plurality of slots that carries a share channel scheduled by the control channel. For example, it is assumed that an indication value of the offset value indication field is i, that is, k0=i. In this case, the quantity of slots in the interval may be i×N, and N is the quantity of slots corresponding to multi-slot scheduling. When the subcarrier spacing is 480 kHz, a value of N may be 4. When the subcarrier spacing is 960 kHz, a value of N may be 8.

For a configuration list of uplink supported multi-slot scheduling, refer to a configuration list of downlink multi-slot scheduling. In other words, a configuration of uplink multi-slot scheduling may be configured in a manner similar to a configuration of downlink multi-slot scheduling.

When the second device is an access network device, the second device may determine a configuration list of the second device and information about the first configuration based on information such as a channel condition, a scheduling rule, and a capability of the terminal device. Alternatively, the second device may determine the modulation order and the first code rate based on quality of a channel between the first device and the second device. Higher quality of the channel indicates a higher modulation order, and/or a higher first code rate.

When the second device is a terminal device, the second device may receive higher layer signaling and control information from an access network device, and then may determine the first configuration based on a configuration list in the higher layer signaling and the control information. The higher layer signaling carries or includes the configuration list, and the control information indicates the first configuration. Alternatively, the second device may receive control information from an access network device and determine the first modulation order and the first code rate based on the control information.

It is assumed that the configuration list may include M3 configurations. It can be understood from the RRC signaling that a minimum value of M3 is 1 and a maximum value is maxNrofDL-Allocations. The access network device may indicate, to the terminal device by using the control information, the first configuration in the M3 configurations in the configuration list. The control information may indicate the first configuration by using $\lceil \log 2(M3) \rceil$ bits. For example, when M3 is 4, the control information may indicate the first configuration by using 2 bits. When a value of the 2 bits is 00, it indicates that the first configuration is a first configuration in the configuration list. When a value of the 2 bits is 01, it indicates that the first configuration is a second configuration in the configuration list. When a value of the 2 bits is 10, it indicates that the first configuration is a third configuration in the configuration list. When a value of the 2 bits is 11, it indicates that the first configuration is a fourth configuration in the configuration list. Therefore, the terminal device may determine the first configuration based on the higher layer signaling and the control information.

502: The second device determines a second code rate, a second quantity, and a second transmission quantity based on the first code rate, the mapping type, the first quantity, and/or the first transmission quantity.

After determining the first configuration, the modulation order, and the first code rate, the second device may determine the second code rate, the second quantity, and the second transmission quantity based on the first code rate, the mapping type, and the first quantity and/or the first transmission quantity. The second code rate is a code rate of the second transport block, the second quantity is a quantity of second transport blocks, and the second transmission quantity is a transmission quantity of the second transport block. The second transport block is a transmitted transport block and may be understood as a transport block sent to the first device. Different second transport blocks may correspond to a same second transmission quantity or different second transmission quantities. The second quantity may be greater than or equal to the first quantity, the second transmission quantity may be less than or equal to the first transmission quantity, and the second code rate may be less than or equal to the first code rate.

When the mapping type is the first type, the second device may divide, based on a valid resource corresponding to each slot in the time domain resource, slots included in the time domain resource into M slot portions, where M is an integer greater than or equal to 1. An absolute value of a difference between valid resources corresponding to any two slots included in any one of the M slot portions is less than or equal to a first threshold. An absolute value of a difference between valid resources in different slots in a same slot portion may be less than or equal to the first threshold, that is, a difference between valid resources in different slots in a same slot portion is small, that is, slots whose valid resources are close are divided into one slot portion. Different redundancy versions of one or more second transport blocks may be transmitted in different slots in a same slot portion. Different second transport blocks are transmitted in slots in different portions. In another implementation, the M slot portions may also be understood as M slot portions. The valid resource corresponding to each slot may be understood as a resource that may be used to transmit a transport block in each slot or may be a resource that may be used to transmit data in each slot.

Then, the second device may determine the second quantity and the second transmission quantity based on a quantity of slots included in each of the M slot portions and the first transmission quantity and may determine the second code rate based on the first code rate, the first transmission quantity, and the second transmission quantity. The second quantity is a sum of quantities of second transport blocks that can be transmitted in each slot portion and may be understood as a quantity of second transport blocks that can be transmitted in all the M slot portions or may be understood as a quantity of all second transport blocks that can be transmitted in the M slot portions. The second device determines, based on a quantity of slots included in an $m^{th}$ slot portion and the first transmission quantity, that a quantity $N_{2,m}$ of second transport blocks that can be transmitted in the $m^{th}$ slot portion and a second transmission quantity $K_{2,m,k}$ ($k=1, \ldots,$ or $N_{2,m}$) corresponding to a $k^{th}$ second transport block in $N_{2,m}$ second transport blocks may meet the following relationships:

$$N_{2,m} = \lceil N_{s,m}/K_1 \rceil, \text{ and}$$

$$K_{2,m,k} = \begin{cases} K_1 & k = 1, \ldots, N_{2,m} - 1 \\ \text{mod}(N_{s,m}, K_1) & k = N_{2,m} \end{cases}$$

$N_{s,m}$ is the quantity of slots included in the $m^{th}$ slot portion, $K_1$ is the first transmission quantity, $K_{2,m,k}$ is the second transmission quantity of the $k^{th}$ second transport block in the second transport blocks transmitted in the $m^{th}$ slot portion, $\lceil \cdot \rceil$ is rounding up, mod($\cdot$) is a modulo operation, and $m=1, \ldots, M$. It can be understood that when $\text{mod}(N_{s,m}, K_1)$ is 0, second transmission quantities of the $N_{2,m}$ second transport blocks transmitted in the $m^{th}$ slot portion in the M slot portions are all $K_1$. When $\text{mod}(N_{s,m}, K_1)$ is not 0, a second transmission quantity of one second transport block transmitted in the $m^{th}$ slot portion in the M slot portions is $\text{mod}(N_{s,m}, K_1)$, and is different from the first transmission quantity; and second transmission quantities of $N_{2,m}-1$ second transport blocks transmitted in the $m^{th}$ slot portion in the M slot portions are $K_1$, such as the first transmission quantity. The quantity of slots included in each slot portion is the quantity of slots included in each slot portion.

The second device determines, based on the first code rate, the first transmission quantity, and the second transmission quantity, that the second code rate may meet the following relationship:

$$C_1 \times K_{2,j}/K_1$$

$C_1$ is the first code rate, $K_1$ is the first transmission quantity, $K_{2,j}$ is a second transmission quantity of a $j^{th}$ second transport block (relative to second transport blocks in all slot portions), $j=1, \ldots, N_2$, and $N_2$ is the second quantity.

Figure 6:
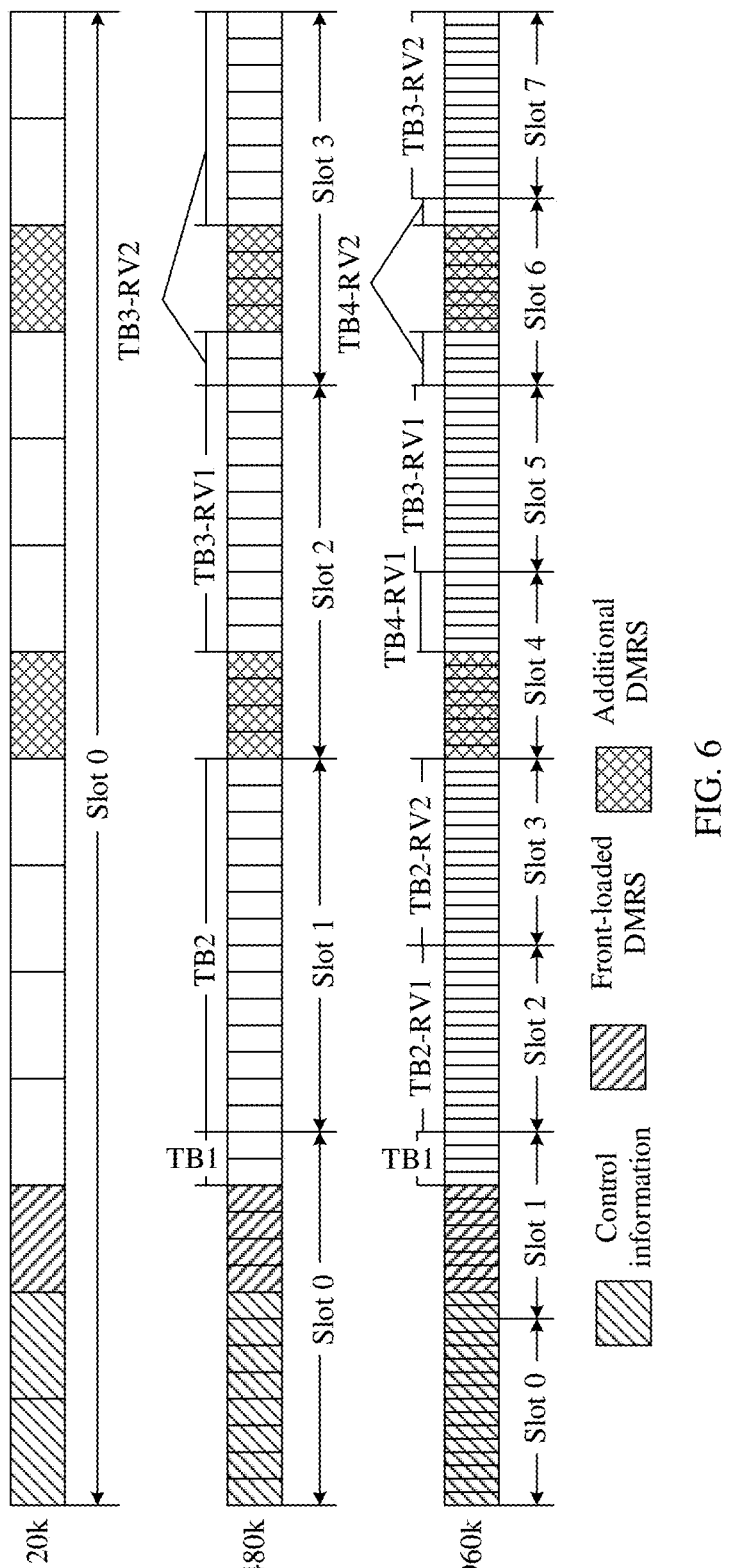
FIG. 6 is a schematic diagram of locations of a PDCCH and a DMRS with different subcarrier spacings according to an embodiment.

For example, FIG. 6 is a schematic diagram of locations of a PDCCH and a DMRS with different subcarrier spacings according to an embodiment. It is assumed that the first transmission quantity is 2. As shown in FIG. 6, when the subcarrier spacing is 120 kHz, symbols occupied by a demodulation reference signal (DMRS) are 2 (such as a third symbol), 7 (such as an eighth symbol), and 11 (such as a twelfth symbol). When the subcarrier spacing is 480 kHz or 960 kHz, a location of the DMRS is aligned with a location of the DMRS in 120 kHz. In other words, in different subcarrier spacings, a start time location and a duration length of the DMRS are the same as a start time location and a duration length of the DMRS in 120 kHz. When there is no other DMRS or channel in the plurality of slots, and the subcarrier spacing is 480 kHz, the second device may divide a slot 0 into a slot portion 1, a slot 1 into a slot portion 2, and slots 2 and 3 into a slot portion 3. The second device may transmit a TB1 in the slot 0, and a second transmission quantity of the TB1 is 1. The second device may transmit a TB2 in the slot 1, and a second transmission quantity of the TB2 is 1. The second device may transmit two redundancy versions (such as a TB3-RV1 and a TB3-RV2) of a TB3 in the slot 2 and the slot 3. It can be understood that a second transmission quantity of the TB3 is 2, and the second quantity (such as a total quantity of transmitted second transport blocks) is 3. Second code rates of the TB1 and the TB2 are adjusted to half of the first code rate, such as $C_1/2$, so that equivalent code rates of the three transport blocks are the same or similar. When the subcarrier spacing is 960 kHz, all symbols in a slot 0 are used to transmit the PDCCH. The second device may divide a slot 1 into one slot portion, may divide slots 2, 3, 5, and 7 into one slot portion, and may divide slots 4 and 6 into one slot portion. In this case, second quantities corresponding to the slot portions are 1, 2, and 1. In other words, a total second quantity is 1+2+1=4. The second device may transmit a TB1 in the slot 1, may transmit two redundancy versions (such as a TB2-RV1 and a TB2-RV2) of a TB2 in the slots 2 and 3, may transmit two redundancy versions (such as a TB3-RV1 and a TB3-RV2) of a TB3 in the slots 5 and 7, and may transmit two redundancy versions (such as a TB4-RV1 and a TB4-RV2) of a TB4 in the slots 4 and 6. Second code rates of the TB2, the TB3, and the TB4 each are the first code rate, and a second code rate of the TB1 is half of the first code rate.

When a time length for multi-slot scheduling is determined based on a slot of the reference subcarrier spacing, an absolute value of a difference between a total length of the plurality of slots for multi-slot scheduling and a length of one slot of the reference subcarrier spacing needs to be less than or equal to a third threshold, to ensure that the total length of the plurality of slots and the length of the slot of the reference subcarrier spacing are as same as or consistent as possible. In addition, to reduce a control channel detection frequency, a control channel in multi-slot scheduling may be aligned with a control channel in single-slot scheduling. Further, in consideration of a limited change of a channel in a plurality of slots, a mapping location of the DMRS may also be aligned with a mapping location of the DMRS in a single slot in 120 kHz, to improve a channel estimation capability of the DMRS. Further, a mapping location of a synchronization signal block (SSB), a random access channel (RACH), a reserved resource, overheads, or the like may also be aligned with a mapping location of that in the single slot. In other words, the control channel, and/or a DMRS of a same type, and/or the SSB, and/or the RACH, and/or the reserved resource, and/or the overheads in multi-slot scheduling are combined or bound. The DMRS may include two types: a front-loaded DMRS and an additional DMRS. A combined control channel and a combined/bound DMRS are used as an example for description. As shown in FIG. 6, the reference subcarrier spacing is 120 kHz. When a scheduled subcarrier spacing is 480 kHz, the quantity of slots for multi-slot scheduling is 4. When a scheduled subcarrier spacing is 960 kHz, the quantity of slots for multi-slot scheduling is 8. A mapping location of control information in 480 kHz or 960 kHz may be aligned with a mapping location of control information in 120 kHz, and the mapping location of the DMRS in 480 kHz or 960 kHz may be aligned with the mapping location of the DMRS in 120 kHz. The control channel may be a PDCCH, a physical uplink control channel (PUCCH), or a physical sidelink control channel (PSCCH).

Figure 7:
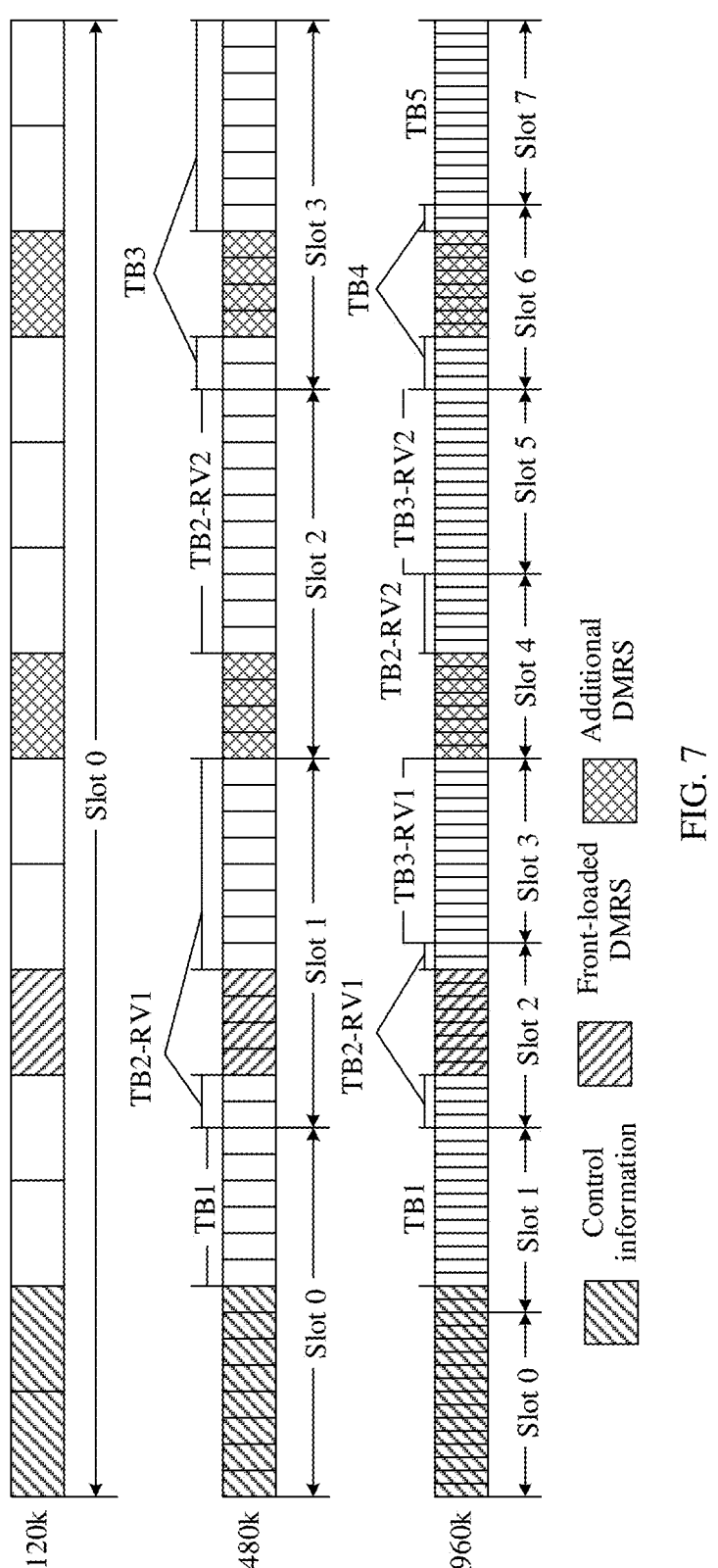
FIG. 7 is another schematic diagram of locations of a PDCCH and a DMRS with different subcarrier spacings according to an embodiment.

When the mapping type is the first type, one redundancy version of one second transport block is transmitted in one slot. When different second transport blocks are transmitted in different slots, locations of bound front-loaded DMRSs may be further adjusted, so that valid resources in the slots are the same as much as possible. FIG. 7 is another schematic diagram of locations of a PDCCH and a DMRS with different subcarrier spacings according to an embodiment. As shown in FIG. 7, a location of a front-loaded DMRS is located on a fifth symbol (such as a symbol 4) of a time domain resource corresponding to the reference subcarrier spacing, such as seventeenth to twentieth symbols (such as third to sixth symbols in a second slot) of a time domain resource corresponding to 480 kHz, and such as thirty-third to fortieth symbols (such as fifth to twelfth symbols in a third slot) of a time domain resource corresponding to 960 kHz. A configuration in FIG. 7 may be used to avoid that if a difference between valid resources in two slots for transmitting two second transport blocks is large, a difference between transport block sizes of different second transport blocks is large, a difference between corresponding quantities of code blocks is large, and demodulation performance of different transport blocks is poor. If a retransmission policy is that when one of a plurality of transport blocks is incorrect, all the transport blocks are retransmitted, decoding performance and spectral efficiency are reduced. When different redundancy versions of a same second transport block are transmitted in different slots, resources used in two slots are aligned based on a slot with a smaller quantity of time domain resources, resulting in a waste of resources in the other slot.

For example, as shown in FIG. 7, when there is no other reference signal or channel in the plurality of slots, when the subcarrier spacing is 480 kHz, the second device may divide a slot 0 into a slot portion 1, and may divide slots 1, 2, and 3 into a slot portion 2. The second device may transmit a TB1 in the slot 0, and a second transmission quantity of the TB1 is 1. The second device may transmit two redundancy versions (such as a TB2-RV1 and a TB2-RV2) of a TB2 in the slot 1 and the slot 2. It can be understood that a second transmission quantity of the TB2 is 2. The second device may transmit a TB3 in the slot 3, and a second transmission quantity of the TB3 is 1. The second quantity (such as a total quantity of transmitted second transport blocks) is 3. Second code rates of the TB1 and the TB3 are adjusted to half of the first code rate, such as $C_1/2$. When the subcarrier spacing is 960 kHz, the second device may divide a slot 1 into one slot portion, may divide slots 2, 4, and 6 into one slot portion, and may divide slots 3, 5, and 7 into one slot portion. In this case, the second quantity is 2+1+2=5. The second device may transmit a TB1 in the slot 1, may transmit a TB2 (such as a TB2-RV1 and a TB2-RV2) in the slots 2 and 4, may transmit a TB3 (such as a TB3-RV1 and a TB3-RV2) in the slots 3 and 5, may transmit a TB4 in the slot 6, and may transmit a TB5 in the slot 7. Second code rates of the TB2 and the TB3 each are the first code rate, and second code rates of the TB1, the TB4, and the TB5 each are half of the first code rate.

Optionally, the two manners may be further flexibly and dynamically selected. For example, the second quantity may be separately calculated according to two manners (adjusting or not adjusting), and a manner corresponding to a smaller second quantity is dynamically selected, to further reduce quantities of bits occupied by a data type indication field and a first indication field that are in the control information and that correspond to each transport block, so as to reduce DCI overheads. Alternatively, to better coexist with or be compatible with an existing frequency of 120 kHz and reduce a channel estimation delay, the location of the DMRS may not be adjusted. In the two manners, a front-loaded DMRS corresponding to one manner is adjacent to the control channel (or a quantity of symbols between the DMRS and the control channel is less than a given threshold), and a front-loaded DMRS corresponding to the other manner is not adjacent to the control channel (or a quantity of symbols between the DMRS and the control channel is greater than the given threshold).

Optionally, FIG. 6 and FIG. 7 are merely schematic diagrams of the corresponding locations of the PDCCH and the DMRS, and the locations are not limited in the method provided. For example, the location of the PDCCH may alternatively be first one to three symbols in every S slots. S may be 4, 8, or another value. For another example, the DMRS may be mapped to only one symbol in each slot.

Optionally, a new MCS may be further determined based on an MCS (indicating the modulation order and the first code rate) indicated by DCI, the first transmission quantity, and the second transmission quantity. A determining method may be as follows: It is assumed that the modulation order indicated by the MCS is Q1, and the first code rate indicated by the MCS is C1. In this case, a spectral efficiency (SE) SE1 corresponding to each RE may be Q1×C1. A correspondence between an MCS index, a modulation scheme, a code rate may be shown in Table 7.

TABLE 7

| MCS index | Modulation order (modulation order) | Code rate × 1024 | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | Reserved |
| 30 | 4 | | Reserved |
| 31 | 6 | | Reserved |

A determined new spectral efficiency SEnew1=(SE1/K1)×K2, where K1 is the first transmission quantity, and K2 is the second transmission quantity.

Then, a SEnew2 closest to the SEnew1 may be searched in Table 7 based on the SEnew1. When SEMCS'≤SEnew1≤SEMCS'+1, an SE that corresponds to a first MCS and that is greater than or equal to the SEnew1 may be determined as the SEnew2, such as SEMCS'+1 corresponding to MCS'+1; or an SE that corresponds to a first MCS and that is less than or equal to the SEnew1 may be determined as the SEnew2, such as SEMCS' corresponding to MCS'; or in an SE that corresponds to a first MCS and that is greater than or equal to the SEnew1 and an SE that corresponds to the first MCS and that is less than or equal to the SEnew1, an SE that has a smaller difference from the SEnew1 may be determined as the SEnew2, such as an SE with a smaller absolute value of a difference from the SEnew1.

Then, an MCS corresponding to the selected SEnew2 may be determined as the new MCS.

For example, it is assumed that the MCS indicated in the DCI is 20, the first transmission quantity is 2, and the second transmission quantity is 1:

(1) Q1=6, C1=567/1024, SE1=Q1×C1=3.3223;
(2) SEnew1=(SE1/K1)×K2=1.66115;
(3) SEMCS'=1.4766, SEMCS'+1=1.6953, MCS'=11;
(4) if an SE, in SEMCS' and SEMCS'+1, whose absolute value of a difference from the SEnew1 is smaller is determined as the SEnew2, SEnew2=SEMCS'+1; and
(5) if an MCS (such as an MCS 12) corresponding to the SEnew2 (such as SEMCS'+1) is determined as the new MCS, a new modulation order is 4, a new code rate is 434/1024.

When the mapping type is the second type, the first code rate may be directly determined as the second code rate, the first quantity may be directly determined as the second quantity, and the first transmission quantity may be directly determined as the second transmission quantity.

503: The second device determines a valid resource of the second transport block based on the time domain resource, the second quantity, and the second transmission quantity.

After determining the second code rate, the second quantity, and the second transmission quantity based on the first code rate, the mapping type, and the first quantity and/or the first transmission quantity, the second device may determine the valid resource of the second transport block based on the time domain resource, the second quantity, and the second transmission quantity.

When the mapping type is the first type, a slot of the second transport block in the time domain resource is determined in step 502, and the valid resource of the second transport block may be determined based on the slot of the second transport block in the time domain resource. Valid resources of different second transport blocks may be the same or may be different. Valid resources of different redundancy versions of a same second transport block are the same or similar.

When the mapping type is the second type, a total valid resource may be first determined based on the time domain resource. The total valid resource is a resource in a time-frequency resource other than a resource occupied by one or more of a control channel, an SSB, a reference signal, a RACH, a reserved resource, and overheads. The time-frequency resource is a time-frequency resource scheduled for the first data. In other words, the total valid resource may be first determined based on a resource occupied by one or more of the time domain resource, the control channel, the reference signal, the SSB, the RACH, the reserved resource, the overheads, or the like. The total valid resource may be a total quantity of valid symbols or may be a total quantity of valid resource elements (RE) or may be a total quantity of valid resource blocks (RB). In this case, one RB may be defined as 12 REs on one symbol. Then, the valid resource of the second transport block may be determined based on the total valid resource, the second quantity, and the second transmission quantity.

In a case, the total valid resource may be first divided into valid resource of the second quantity, to obtain the valid resource of the second transport block. Each valid resource is used to transmit one second transport block. Then, the valid resource of the second transport block may be divided into valid resources of the second transmission quantity, to obtain a valid resource for each transmission of the second transport block. The valid resource herein may be a valid symbol, a valid RE, or a valid RB. When the total valid resource is a quantity of valid symbols, a same second transport block may be transmitted across slots but cannot be transmitted across symbols. When the total valid resource is an RE or an RB, a same second transport block may be transmitted across slots and symbols. The valid resource corresponding to each transmission of the second transport block may be shown in Table 8.

TABLE 8

| Division granularity | | Quantity of valid symbols | Quantity of valid resources |
|---|---|---|---|
| $N_2$ $N_2 - 1$ portion | $K_2 - 1$ transmissions | $\lfloor\lfloor Nsym/N_2 \rfloor/K_2 \rfloor$ | $\lfloor\lfloor Nre/N_2 \rfloor/K_2 \rfloor$ or $\lfloor\lfloor Nrb/N_2 \rfloor/K_2 \rfloor$ |
| | One remaining transmission | $mod(\lfloor Nsym/N_2 \rfloor, K_2)$ | $mod(\lfloor Nre/N_2 \rfloor, K_2)$ or $mod(\lfloor Nrb/N_2 \rfloor, K_2)$ |
| One remaining portion | $K_2 - 1$ transmissions | $\lfloor mod(Nsym, N_2)/K_2 \rfloor$ | $\lfloor mod(Nre, N_2)/K_2 \rfloor$ or $\lfloor mod(Nrb, N_2)/K_2 \rfloor$ |
| | One remaining transmission | $mod(mod(Nsym, N_2), K_2)$ | $mod(mod (Nre, N_2), K_2)$ or $mod(mod (Nrb, N_2), K_2)$ |

$N_2$ is the second quantity, $K_2$ is the second transmission quantity, Nsym indicates a total quantity of valid symbols, Nre indicates a total quantity of valid REs, Nrb indicates a total quantity of valid RBs, $\lfloor \bullet \rfloor$ indicates rounding down, and $$mod(A, B) = A - \left\lfloor \frac{A}{B} \right\rfloor \times B.$$

For example, when A=6 and B=4, mod(A, B)=2. As shown in Table 8, the total valid resource may be first divided into $N_2$ portions. The $N_2$–1 portions of valid resources are $\lfloor Nsym/N2 \rfloor$, the remaining one portion of valid resource is $mod(Nsym/N_2)$, and each of the $N_2$ portions of valid resources is used to transmit one second transport block. The $N_2$–1 portions of valid resources $\lfloor Nsym/N_2 \rfloor$ may be processed, valid resources for $K_2$–1 transmissions corresponding to each portion of resource are $\lfloor\lfloor Nsym/N_2 \rfloor/K_2 \rfloor$, and a valid resource for the remaining one transmission is mod $(\lfloor Nsym/N_2 \rfloor, K_2)$. The remaining one portion of valid resource $mod(Nsym/N_2)$ may be processed, a valid resource for $K_2$–1 transmissions corresponding to the remaining one portion of valid resource is $\lfloor mod(Nsym, N_2)/K_2 \rfloor$, and a valid resource for the remaining one transmission is mod $(mod(Nsym, A), K_2)$. Herein, Nsym may alternatively be Nre or Nrb.

In another case, the total valid resource may be divided into valid resources of a first product, to obtain the valid resource for each transmission of the second transport block. The valid resource may be an RE or a resource block. The first product is a product of the second quantity and the second transmission quantity. Each resource is used to transmit one redundancy version of one second transport block. Cross-slot and cross-symbol transmissions of a same second transport block are allowed. The valid resource corresponding to each transmission of the second transport block may be shown in Table 9.

TABLE 9

| Division granularity | | Quantity of valid resources |
|---|---|---|
| $N_2 \times K_2$ | $(N_2 - 1) \times K_2$ portions | $\lfloor Nre/(N_2 \times K_2) \rfloor$ or $\lfloor Nrb/(N_2 \times K_2) \rfloor$ |
| | Remaining $K_2$ portions | $\lfloor mod(Nre, (N_2 \times K_2))/K_2 \rfloor$ or $\lfloor mod(Nrb, (N_2 \times K_2))/K_2 \rfloor$ |

As shown in Table 9, the total valid resource may be first divided into $N_2 \times K_2$ portions, $(N_2-1) \times K_2$ portions of valid resources are $\lfloor Ne/(N_2 \times K_2) \rfloor$, and remaining $K_2$ portions of valid resources are $\lfloor mod(Ne, (N_2 \times K_2))/K_2 \rfloor$. The $(N_2-1) \times K_2$ portions of valid resources are used to transmit $N_2$–1 second transport blocks, and the remaining $K_2$ portions of valid resources are used to transmit one remaining second transport block. Herein, Ne may be Nre, Nrb, or Nsym.

504: The second device sends second data to the first device based on the first data, the modulation order, the second code rate, and the valid resource of the second transport block.

After determining the valid resource of the second transport block based on the time domain resource, the second quantity, and the second transmission quantity, the second device may send the second data to the first device based on the first data, the modulation order, the second code rate, and the valid resource of the second transport block. The second device may first determine a TB size (TBS) of the second transport block based on the modulation order, the second code rate, and the valid resource of the second transport block; then encode the first data based on the TBS of the second transport block, to obtain the second data; and send the second data to the first device. After the first data is encoded to obtain the second data, the second data may be further modulated to obtain third data. Then, the third data may be mapped to a corresponding time-frequency resource, and the third data is sent to the first device. The TBS may be a product of the valid resource of the second transport block, the second code rate, and the modulation order.

In addition, the control information, the reference signal, and the like further need to be mapped to corresponding locations of the time-frequency resource.

When the second device is an access network device, the control channel carries the control information.

The control information indicates the first configuration, the modulation order, and the first code rate.

The control information may further include the first indication field. When the first indication field indicates a correspondence between a redundancy version of a second transport block and n, the first indication field is 1 bit, n indicates an $n^{th}$ transmission of the second transport block, and n=1, 2, . . . , $K_2$. $K_2$ represents the transmission quantity of the second transport block. If the second quantity is $N_2$, each second transport block corresponds to an independent first indication field, and a second indication field is formed in a bitmap (bitmap) manner, to indicate a correspondence between redundancy versions of all second transport blocks and n, a quantity of bits of the second indication field is the second quantity. A relationship between the first indication field and information about the redundancy version may be, for example, at least one of Table 10 to Table 13.

TABLE 10

| First indication | Information about a redundancy version corresponding to an $n^{th}$ transmission | | | |
|---|---|---|---|---|
| field | n mod 4 = 1 | n mod 4 = 2 | n mod 4 = 3 | n mod 4= 0 |
| 0 | 0 | 2 | 3 | 1 |
| 1 | 3 | 1 | 0 | 2 |

TABLE 11

| First indication | Information about a redundancy version corresponding to an $n^{th}$ transmission | | | |
|---|---|---|---|---|
| field | n mod 4 = 1 | n mod 4 = 2 | n mod 4 = 3 | n mod 4 = 0 |
| 0 | 0 | 2 | 1 | 3 |
| 1 | 1 | 3 | 0 | 2 |

TABLE 12

| First indication | Information about a redundancy version corresponding to an $n^{th}$ transmission | | | |
|---|---|---|---|---|
| field | n mod 4 = 1 | n mod 4 = 2 | n mod 4 = 3 | n mod 4 = 0 |
| 0 | 0 | 3 | 1 | 2 |
| 1 | 1 | 2 | 0 | 3 |

TABLE 13

| First indication | Information about a redundancy version corresponding to an $n^{th}$ transmission | | | |
|---|---|---|---|---|
| field | n mod 4 = 1 | n mod 4 = 2 | n mod 4 = 3 | n mod 4 = 0 |
| 0 | 0 | 3 | 2 | 1 |
| 1 | 2 | 1 | 0 | 3 |

As shown in Table 10 to Table 13, the first indication field indicates information about the redundancy version. A relationship between the redundancy version and n varies with a value of the first indication field. In other words, information about a redundancy version in each transmission of the second transport block may be different. In Table 10 to Table 13, information about a redundancy version with n mod 4=1 when the value of the first indication field is 0 is the same as information about a redundancy version with n mod 4=3 when the value of the first indication field is 1. Information about a redundancy version with n mod 4=2 when the value of the first indication field is 0 is the same as information about a redundancy version with n mod 4=0 when the value of the first indication field is 1. Information about a redundancy version with n mod 4=3 when the value of the first indication field is 0 is the same as information about a redundancy version with n mod 4=1 when the value of the first indication field is 1. Information about a redundancy version with n mod 4=0 when the value of the first indication field is 0 is the same as information about a redundancy version with n mod 4=2 when the value of the first indication field is 1.

A relationship between the redundancy version indicated by the first indication field in Table 10 to Table 13 and the transmission quantity n has the following characteristics:

(1) a same indication field and different mod(n, 4) correspond to different redundancy versions;

(2) different indication fields and same mod(n, 4) correspond to different redundancy versions; and (3) when the indication field is 0 and 1, mod(n,4)=M and mod(n,4)=M+1 include four different redundancy versions (0, 1, 2, 3). In other words, all redundancy versions of any two adjacent columns are a redundancy version full set (0, 1, 2, 3).

It should be understood that Table 10 to Table 13 are examples of the relationship between the first indication field and the information about the redundancy version, and do not constitute a limitation on the relationship. The relationship between the first indication field and the information about the redundancy version may alternatively be in another manner.

The control information may further include the data type indication field. A quantity of bits of the data type indication field is the second quantity, and whether data transmitted in the second transport block is new data or retransmitted data is indicated in a bitmap (bitmap) manner. For example, an $i^{th}$ bit indicates whether an $i^{th}$ second transport block is used to transmit new data or retransmitted data.

Correspondingly, the first device receives the second data from the second device.

505: The first device determines the first configuration, the modulation order, and the first code rate.

For detailed descriptions of step 505, refer to descriptions of step 501.

506: The first device determines the second code rate, the second quantity, and the second transmission quantity based on the first code rate, the mapping type, the first quantity, and/or the first transmission quantity.

For detailed descriptions of step 506, refer to descriptions of step 502.

507: The first device determines the valid resource of the second transport block based on the time domain resource, the second quantity, and the second transmission quantity.

For detailed descriptions of step 507, refer to descriptions of step 503.

508: The first device determines the first data based on the second data, the modulation order, the second code rate, and the valid resource of the second transport block.

After receiving the control channel and the shared channel from the second device, the first device may determine a mapping location of a reference signal in the time domain resource, and then may obtain the reference signal from the shared channel. Then, the first device may perform channel estimation based on the reference signal. Then, the first device may perform equalization, demapping, and the like on the second data based on a channel estimation result, to obtain the third data. Then, the first device may decode the third data to obtain fourth data. After the fourth data is obtained, data corresponding to each transport block in decoded data may be first checked by using a check code. When the check succeeds, it indicates that the data corresponding to the second transport block is correctly transmitted, and the fourth data may be determined as the first data. When the check fails, it indicates that the data corresponding to the second transport block fails to be transmitted. Then, the first device may send, to the second device in a bitmap manner, whether the TB is successfully received. Each second transport block corresponds to one acknowledgment (ACK) or negative acknowledgment (NACK). It can be understood that a quantity of bits of feedback information is equal to the second quantity. When a second transmission quantity of a second transport block is greater than 1, if any redundancy version of the second transport block is successfully checked, it indicates that the second transport block is successfully checked; or if all redundancy versions of the second transport block fail to be checked, it indicates that the second transport block fails to be checked.

Optionally, ACK or NACK information of a plurality of TBs may alternatively be combined and fed back. For example, if all second transport blocks are correctly transmitted, one ACK is fed back. Otherwise, one NACK is fed back. Only one bit is required in this manner. In addition, to reduce a probability of a NACK feedback, a target block error rate (block error rate, BLER) in this manner may be increased. For example, the target BLER may be increased from conventional 0.9 to 0.975.

In the solution in which the ACK/NACK information of the plurality of TBs is fed back in the bitmap manner or in the combined manner, a same hybrid automatic repeat request (HARQ) process may indicate a feedback time, or the like.

It should be understood that, in the method, the first transmission quantity corresponding to each first transport block in multi-slot scheduling is the same.

It should be understood that the reference signal may be a DMRS or another reference signal. However, only the indicated quantity of transport blocks. The first transmission quantity of the first transport block is a transmission quantity of the first transport block, such as an indicated transmission quantity. The time domain resource of the first transport block is a total time domain resource used to transmit the first transport block. The first code rate is a code rate of the first transport block. It can be understood that time domain resources of different first transport blocks are different, and first transmission quantities of different first transport blocks may also be different. The first transport block may be understood as an indicated transport block. The modulation order is an order used during modulation, and modulation orders of all transport blocks are the same.

The following provides description by using an example in which the second device is an access network device, the first device is a terminal device, and higher layer signaling is RRC signaling. In other words, a downlink transmission is used as an example for description. A configuration list of an RRC signaling transmission may be PDSCH-TimeDomainResourceAllocationList, and is an IE in the RRC signaling. The IE may be as follows:

```
          PDSCH-TimeDomainResourceAllocationList::=SEQUENCE  (SIZE(1..maxNrofDL-
Allocations)) OF PDSCH-TimeDomainResourceAllocation
          PDSCH-TimeDomainResourceAllocation :: = SEQUENCE {
              k0                                    INTEGER(0..32)
          OPTIONAL,
              PDSCHAllocationList          SEQUENCE  (SIZE(1..maxNrofPDSCH))  of
PDSCH-Allocation
              }
          PDSCH-Allocation :: = SEQUENCE {
              mappingType                               ENUMERATED {typeA,
typeB},
              startSymbolAndLength                  INTEGER (0..maxSLIV)
              repetitionNumber                        INTEGER
(1,2,...,maxNofRepeat4PDSCH)
              }
          PDSCH-TimeDomainResourceAllocationList-r17 ::= SEQUENCE
          (SIZE(1..maxNrofDL-Allocations)) OF PDSCH-TimeDomainResourceAllocation-r17
          PDSCH-TimeDomainResourceAllocation-r17 ::=   SEQUENCE {
              k0-r17                                INTEGER(0..32)
          OPTIONAL,?
              PDSCHAllocationList-r17                            SEQUENCE
(SIZE(1..maxNrofPDSCHr-17)) of PDSCH-Allocation-r17
              }
          PDSCH-Allocation-r17 :: SEQUENCE {
              mappingType-r17                        ENUMERATED {typeA, typeB},
              startSymbolAndLength-r17               INTEGER (0..maxSLIV-r17),
              repetitionNumber-r17                    ENUMERATED {n2, n3, n4, n5,
n6, n7, n8, n16,n17,n18,...,n64}           OPTIONAL,
              ...
              }
```

DMRS has a front-loaded DMRS. A solution of adjusting a location of the front-loaded DMRS may also be applied to another reference signal that is close to a PDCCH time domain location, and the like.

Figure 8:
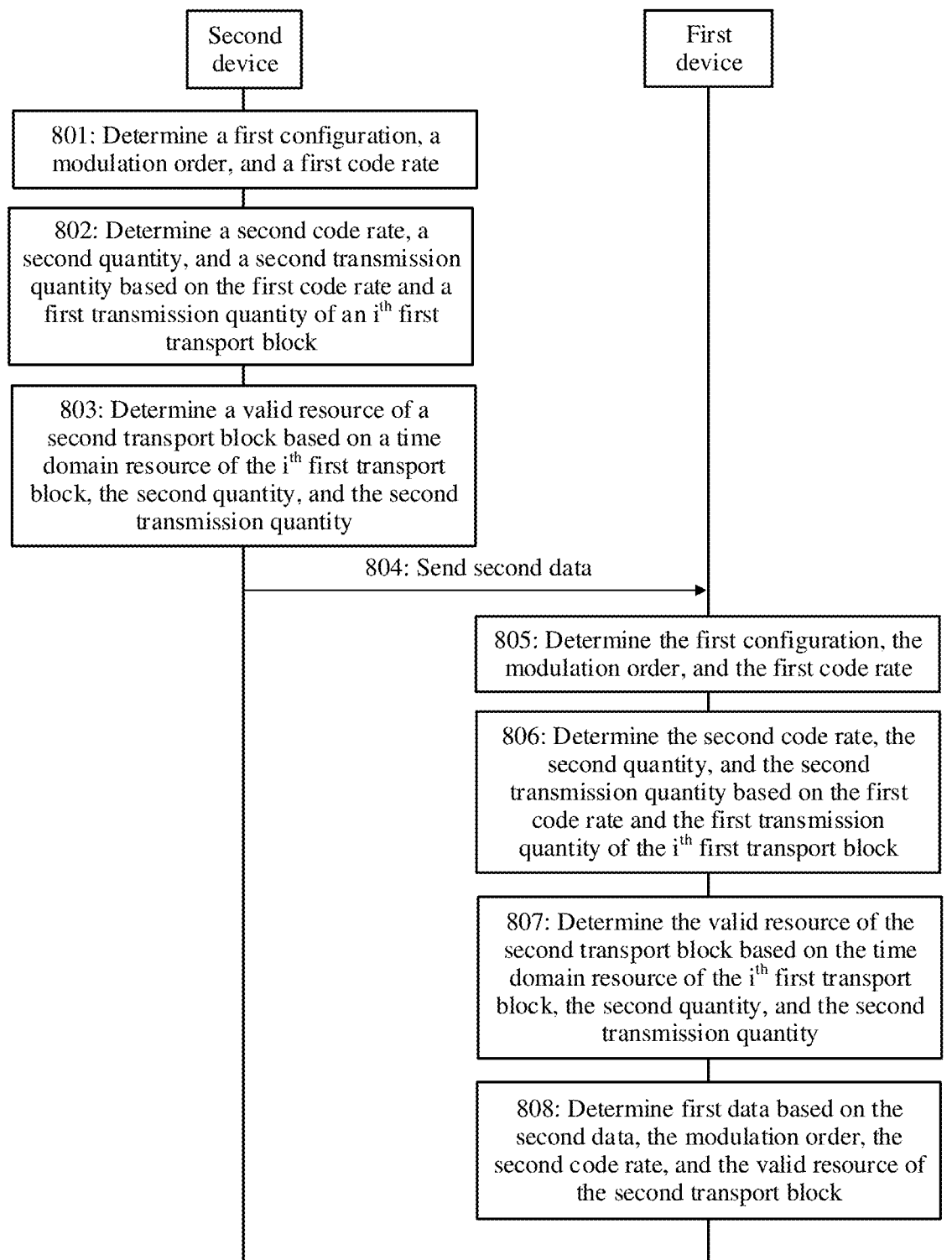
FIG. 8 is a schematic flowchart of another communication method according to an embodiment.

Based on the network architecture, FIG. 8 is a schematic flowchart of another communication method according to an embodiment. As shown in FIG. 8, the communication method may include the following steps.

801: A second device determines a first configuration, a modulation order, and a first code rate.

When the second device needs to send first data to a first device, the second device may determine the first configuration, the modulation order, and the first code rate. The first configuration may include information about a first quantity of first transport blocks, and the information about the first transport block may include a first transmission quantity and a time domain resource of the first transport block. The first quantity is a quantity of first transport blocks, such as an As shown in the configuration list, the quantity of first transport blocks and a first transmission quantity and a time domain resource of each first transport block may be indicated based on PDSCHAllocationList and PDSCH-Allocation. It can be understood that the first transmission quantity and the time domain resource of each first transport block are separately indicated. For detailed descriptions of k0 and an SLIV in the configuration information, refer to the foregoing descriptions. The configuration list may be added to the 5G release 16 (R16) (such as PDSCHAllocationList), or may be defined in a new future 5G standard release (that is, similar to PDSCHAllocationList-r17). The configuration list may alternatively use another name in a future standard.

An allocation granularity of the time domain resource may be accurate to a symbol level. The granularity of the time domain resource may alternatively be accurate to a predefined time unit. The time unit may be one or more symbols included in a specified absolute time length or may include one or more symbols of a specified symbol quantity.

For other detailed descriptions of step 801, refer to related descriptions in step 501.

802: The second device determines a second code rate, a second quantity, and a second transmission quantity based on the first code rate and a first transmission quantity of an $i^{th}$ first transport block.

After determining the first configuration, the modulation order, and the first code rate, the second device may determine the second code rate, the second quantity, and the second transmission quantity based on the first code rate and the first transmission quantity of the $i^{th}$ first transport block. The second code rate is a code rate of a second transport block corresponding to the $i^{th}$ first transport block, the second quantity is a quantity of second transport blocks corresponding to the $i^{th}$ first transport block, the second transmission quantity is a transmission quantity of the second transport block corresponding to the $i^{th}$ first transport block, $i=1, 2, \ldots, N_1$, and $N_1$ is the first quantity. The second quantity is an integer greater than or equal to 1.

In a case, the second device may determine the first code rate as the second code rate, may determine that the second quantity is 1, and may determine the first transmission quantity of the $i^{th}$ first transport block as the second transmission quantity. It can be understood that an indicated code rate, quantity, and transmission quantity of a transport block may be configurations of the to-be-transmitted transport block.

In another case, the second device may determine valid resources on different symbols in an $i^{th}$ time domain resource, where the $i^{th}$ time domain resource is a time domain resource of the $i^{th}$ first transport block. The valid resource may be an RE or a resource block. Then, the second device may divide, based on the valid resources on different symbols in the $i^{th}$ time domain resource, the symbols corresponding to the $i^{th}$ time domain resource, to obtain $M_i$ symbol portions, where $M_i$ is an integer greater than or equal to 1, and an absolute value of a difference between valid resources on any two symbols included in each of the $M_i$ symbol portions is less than or equal to a second threshold. The division manner is similar to that in step 502. Then, the second device may determine the second quantity and the second transmission quantity based on a portion quantity $M_i$, a quantity of symbols included in each of the $M_i$ symbol portions, and the first transmission quantity of the $i^{th}$ first transport block, and may determine the second code rate based on the first code rate, the first transmission quantity of the $i^{th}$ first transport block, and the second transmission quantity.

803: The second device determines a valid resource of the second transport block based on the time domain resource of the $i^{th}$ first transport block, the second quantity, and the second transmission quantity.

After determining the second code rate, the second quantity, and the second transmission quantity based on the first code rate and the first transmission quantity of the $i^{th}$ first transport block, the second device may determine the valid resource of the second transport block based on the time domain resource of the $i^{th}$ first transport block, the second quantity, and the second transmission quantity.

In a case, when the indicated code rate, quantity, and transmission quantity of the first transport block are configurations of the to-be-transmitted transport block, a valid resource of the $i^{th}$ first transport block may be determined based on the time domain resource of the $i^{th}$ first transport block. The valid resource may be a symbol, an RE, or an RB.

Then, the second device may divide the valid resource of the $i^{th}$ first transport block into valid resources of the second transmission quantity, to obtain a valid resource for each transmission of the second transport block corresponding to the $i^{th}$ first transport block. Each valid resource is used to transmit one redundancy version of one second transport block. For an even allocation manner, refer to the descriptions of dividing the total valid resource into $N_2$ in Table 3.

In another case, it is assumed that the symbols corresponding to the $i^{th}$ first transport block are divided into $M_i$ symbol portions, and a quantity of symbols in a $j^{th}$ symbol portion in the $M_i$ symbol portions is $N_{i,j}$, and $j=1, 2, \ldots, M_i$.

When $M_i=1$, and a remainder between $N_{i,j}$ and the first transmission quantity $K_{1,i}$ of the $i^{th}$ first transport block is 0, the second quantity is 1, the second code rate is the first code rate, and the second transmission quantity is the first transmission quantity. A quantity of valid symbols corresponding to each transmission of the second transport block is $N_{i,j}/K_{1,i}$.

When $M_i=1$, and $N_{i,j}$ is less than $K_{1,i}$, the second device may determine, in a manner of evenly allocating time domain resources of the transport block (referring to the descriptions of dividing the total valid resource into $N_2$ in Table 8), the valid resource corresponding to each transmission of the second transport block, where the second quantity is 1, the second code rate is the first code rate, and the second transmission quantity is the first transmission quantity. In this case, a redundancy version may cross symbols. When $M_i=1$, and $N_{i,j}$ is less than $K_{1,i}$, there may be another manner. For example, the second quantity is 1, the second transmission quantity is $N_{i,j}$, and the second code rate is $C_1 \times N_{i,j}/K_{1,i}$. In this case, one symbol is used to transmit a redundancy version of one second transport block. $C_1$ is the first code rate. Optionally, a new MCS may alternatively be determined with reference to the foregoing method.

When $M_i=1$, and $N_{i,j}$ is greater than $K_{1,i}$, it may be determined that the second quantity is 2, that is, one first transport block corresponds to two second transport blocks. One second transport block is transmitted on first $N_{i,j}-\mathrm{mod}$ $(N_{i,j}, K_{1,i})$ symbols, and a quantity of symbols to which each redundancy version is mapped is $\lfloor N_{i,j}/K_{1,i} \rfloor$. Another second transport block is transmitted on following $\mathrm{mod}(N_{i,j}, K_{1,i})$ symbols. In a case, a transmission quantity of the another second transport block is 1, that is, there may be only one redundancy version, and the second code rate is $C_1/K_{1,i}$. In another case, a second transmission quantity of the another second transport block may be $\mathrm{mod}(N_{i,j}, K_{1,i})$, and a corresponding second code rate may be $C_1 \times \mathrm{mod}(N_{i,j}, K_{1,i})/K_{1,i}$. $C_1$ is the first code rate. Optionally, a new MCS may alternatively be determined with reference to the foregoing method.

When $M_i$ is greater than 1, the second quantity may be $M_i$. One second transport block is transmitted on each symbol, and each second transport block may have only one redundancy version or may have a plurality of redundancy versions. Alternatively, for a method for determining a configuration of the second transport block in each symbol, refer to the case in which $M_i=1$.

804: The second device sends second data to the first device based on the first data, the modulation order, the second code rate, and the valid resource of the second transport block.

For detailed descriptions of step 804, refer to descriptions of step 504.

805: The first device determines the first configuration, the modulation order, and the first code rate.

For detailed descriptions of step 805, refer to descriptions of step 801.

806: The first device determines the second code rate, the second quantity, and the second transmission quantity based on the first code rate and the first transmission quantity of the $i^{th}$ first transport block.

For detailed descriptions of step 806, refer to descriptions of step 802.

807: The first device determines the valid resource of the second transport block based on the time domain resource of the $i^{th}$ first transport block, the second quantity, and the second transmission quantity.

For detailed descriptions of step 807, refer to descriptions of step 803.

808: The first device determines the first data based on the second data, the modulation order, the second code rate, and the valid resource of the second transport block.

For detailed descriptions of step 808, refer to descriptions of step 508.

It should be understood that, in the communication method, a function performed by the first device may also be performed by a module (for example, a chip) in the first device, and a function performed by the second device may also be performed by a module (for example, a chip) in the second device.

The first device may be an access network device and the second device may be a terminal device. The first device may be a terminal device, and the second device may be an access network device. Both the first device and the second device may be terminal devices.

It should be understood that related information in the foregoing different embodiments may be mutually referenced.

Figures 9, 10:
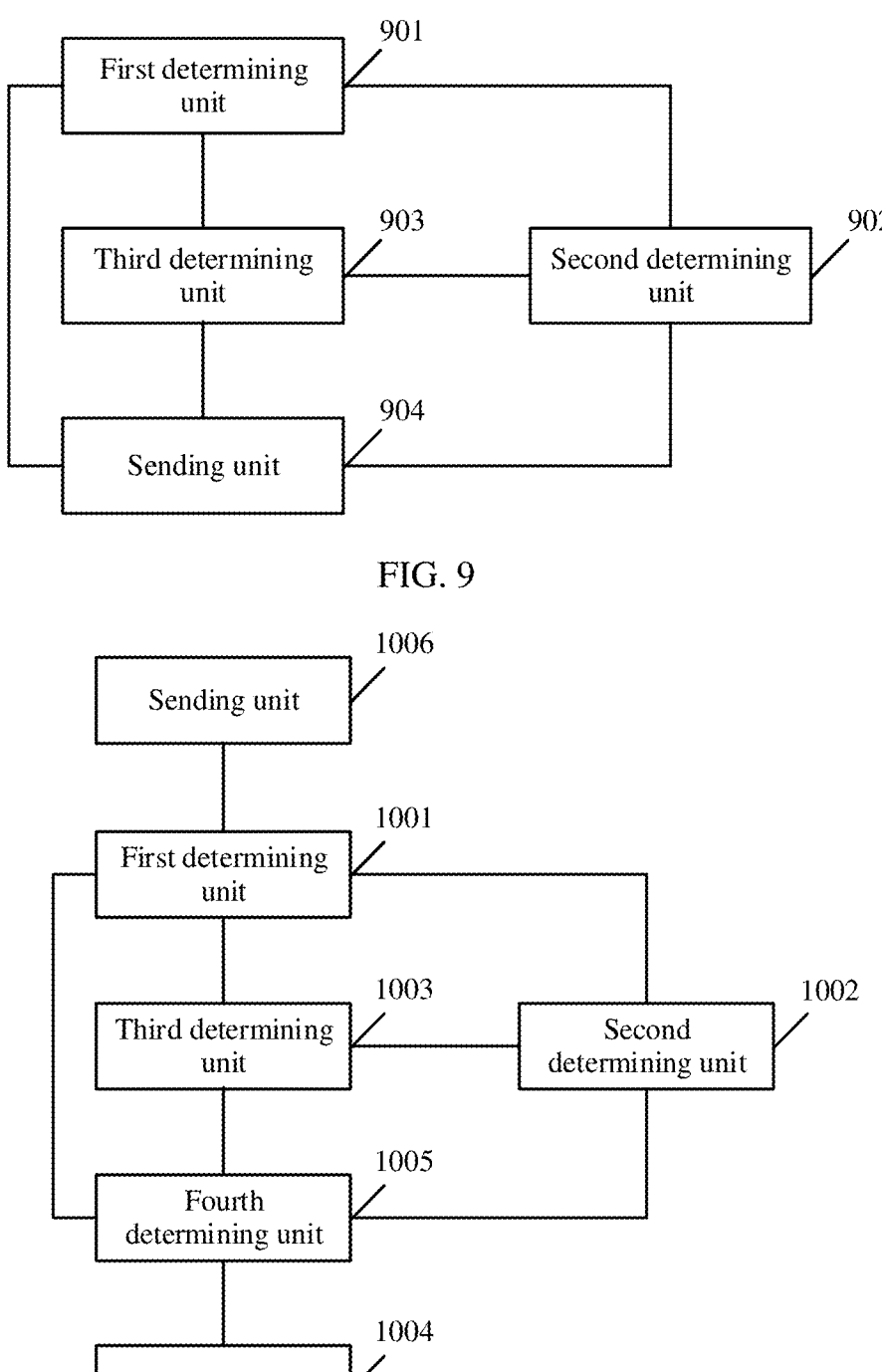
FIG. 9 is a schematic diagram of a structure of a communication apparatus according to an embodiment.
FIG. 10 is a schematic diagram of a structure of another communication apparatus according to an embodiment.

Based on the network architecture, FIG. 9 is a schematic diagram of a structure of a communication apparatus according to an embodiment. As shown in FIG. 9, the communication apparatus may include a first determining unit 901, a second determining unit 902, a third determining unit 903, and a sending unit 904.

In a case, the communication apparatus may be a second device, or may be a module (for example, a chip) in a second device.

The first determining unit 901 is configured to determine a first configuration, a modulation order, and a first code rate, where the first configuration includes a mapping type, a time domain resource, and a first quantity and/or a first transmission quantity, the first quantity is a quantity of first transport blocks, the first transmission quantity is a transmission quantity of the first transport block, and the first code rate is a code rate of the first transport block.

The second determining unit 902 is configured to determine a second code rate, a second quantity, and a second transmission quantity based on the first code rate, the mapping type, and the first quantity and/or the first transmission quantity, where the second code rate is a code rate of a second transport block, the second quantity is a quantity of second transport blocks, and the second transmission quantity is a transmission quantity of the second transport block.

The third determining unit 903 is configured to determine a valid resource of the second transport block based on the time domain resource, the second quantity, and the second transmission quantity.

The sending unit 904 is configured to send second data to a first device based on first data, the modulation order, the second code rate, and the valid resource of the second transport block.

In an embodiment, when the mapping type is a first type, the second determining unit 902 may be configured to:

divide, based on a valid resource in each slot in the time domain resource, slots included in the time domain resource to obtain M slot portions, where M is an integer greater than or equal to 1, and an absolute value of a difference between valid resources in any two slots included in any one of the M slot portions is less than or equal to a first threshold;

determine the second quantity and the second transmission quantity based on a quantity of slots included in each of the M slot portions and the first transmission quantity; and determine the second code rate based on the first code rate, the first transmission quantity, and the second transmission quantity.

In an embodiment, that the second determining unit 902 determines the second quantity and the second transmission quantity based on the quantity of slots included in each of the M slot portions and the first transmission quantity includes:

determining, based on the quantity of slots included in each of the M slot portions and the first transmission quantity, that the second quantity and the second transmission quantity meet the following relationships:

$$N_{2,m} = \lceil N_{s,m}/K_1 \rceil, \text{ and}$$

$$K_{2,m,k} = \begin{cases} K_1 & k = 1, \dots, N_{2,m} - 1 \\ \mod(N_{s,m}, K_1) & k = N_{2,m} \end{cases}$$

$N_{2,m}$ is a quantity of second transport blocks transmitted in an $m^{th}$ slot portion in the M slot portions, $N_{s,m}$ is a quantity of slots included in the $m^{th}$ slot portion, $K_1$ is the first transmission quantity, $K_{2,m,k}$ is a second transmission quantity of a $k^{th}$ second transport block in the second transport blocks transmitted in the $m^{th}$ slot portion, $\lceil \cdot \rceil$ is rounding up, $\mod(\cdot)$ is a modulo operation, and m=1, . . . , M.

In an embodiment, the second determining unit 902 determines, based on the first code rate, the first transmission quantity, and the second transmission quantity, that a second code rate of a $j^{th}$ second transport block meets the following relationship:

$$C_1 \times K_{2,j}/K_1$$

$C_1$ is the first code rate, $K_1$ is the first transmission quantity, $K_{2,j}$ is a second transmission quantity of the $j^{th}$ second transport block, j=1, . . . , $N_2$, and $N_2$ is the second quantity.

In an embodiment, when the mapping type is a second type, the second determining unit 902 may be configured to:

determine the first code rate as the second code rate;

determine the first quantity as the second quantity; and determine the first transmission quantity as the second transmission quantity.

In an embodiment, the third determining unit 903 may be configured to:

determine a total valid resource based on the time domain resource, where the total valid resource is a resource in a time-frequency resource other than a resource occupied by one or more of a control channel, a synchronization signal block, a reference signal, a random access channel, a reserved resource, and overheads; and the time-frequency resource is a time-frequency resource scheduled for the first data; and determine the valid resource of the second transport block based on the total valid resource, the second quantity, and the second transmission quantity.

In an embodiment, that the third determining unit 903 determines the valid resource of the second transport block based on the total valid resource, the second quantity, and the second transmission quantity includes:

dividing the total valid resource into valid resources of the second quantity, to obtain the valid resource of the second transport block, where the valid resource is a symbol, a resource element, or a resource block; and dividing the valid resource of the second transport block into valid resources of the second transmission quantity, to obtain a valid resource for each transmission of the second transport block.

In an embodiment, that the third determining unit 903 determines the valid resource of the second transport block based on the total valid resource, the second quantity, and the second transmission quantity includes:

dividing the total valid resource into valid resources of a first product, to obtain a valid resource for each transmission of the second transport block, where the first product is a product of the second quantity and the second transmission quantity, and the valid resource is a resource element or a resource block.

In an embodiment, the first quantity and/or the first transmission quantity are/is a power of 2.

In an embodiment, the sending unit 904 is further configured to:

send control information to a terminal device, where the control information indicates the first configuration, the modulation order, and the first code rate; and send first signaling to the terminal device, where the first signaling indicates a plurality of configurations, and the plurality of configurations include the first configuration.

In an embodiment, the control information includes a first indication field, the first indication field indicates a correspondence between a redundancy version and n, the first indication field is 1 bit, n represents an $n^{th}$ transmission of the second transport block, $n=1, 2, \ldots, N_2$, and $N_2$ is the second quantity.

In an embodiment, that the sending unit 904 sends the first data to the first device based on the modulation order, the second code rate, and the valid resource of the second transport block includes:

determining a transport block size of the second transport block based on the modulation order, the second code rate, and the valid resource of the second transport block;

encoding the first data based on the transport block size of the second transport block, to obtain the second data; and sending the second data to the first device.

In an embodiment, a granularity of the time domain resource is one symbol, $2^{\Delta\mu}$ symbols, or a predefined time unit, and $\Delta\mu$ is determined based on a scheduled subcarrier spacing and a reference subcarrier spacing.

For more detailed descriptions of the first determining unit 901, the second determining unit 902, the third determining unit 903, and the sending unit 904, directly refer to related descriptions of the second device in the method embodiment shown in FIG. 5. Details are not described herein again.

In another case, the communication apparatus may be a second device, or may be a module (for example, a chip) in a second device.

The first determining unit 901 is configured to determine a first configuration, a modulation order, and a first code rate, where the first configuration includes information about a first quantity of first transport blocks, the information includes a first transmission quantity and a time domain resource, and the first code rate is a code rate of the first transport block.

The second determining unit 902 is configured to determine a second code rate, a second quantity, and a second transmission quantity based on the first code rate and a first transmission quantity of an $i^{th}$ first transport block, where the second code rate is a code rate of a second transport block corresponding to the $i^{th}$ first transport block, the second quantity is a quantity of second transport blocks corresponding to the $i^{th}$ first transport block, the second transmission quantity is a transmission quantity of the second transport block corresponding to the $i^{th}$ first transport block, $i=1, 2, \ldots, N_1$, and $N_1$ is the first quantity.

The third determining unit 903 is configured to determine a valid resource of the second transport block based on a time domain resource of the $i^{th}$ first transport block, the second quantity, and the second transmission quantity.

The sending unit 904 is configured to send second data to a first device based on first data, the modulation order, the second code rate, and the valid resource of the second transport block.

In an embodiment, the second determining unit 902 may be configured to:

determine the first code rate as the second code rate;

determine that the second quantity is 1; and determine the first transmission quantity of the $i^{th}$ first transport block as the second transmission quantity.

In an embodiment, the third determining unit 903 may be configured to:

determine a valid resource of the $i^{th}$ first transport block based on the time domain resource of the $i^{th}$ first transport block, where the valid resource is a symbol, a resource element, or a resource block; and divide the valid resource into valid resources of the second transmission quantity, to obtain a valid resource for each transmission of the second transport block.

In an embodiment, the second determining unit 902 may be configured to:

determine valid resources on different symbols in an $i^{th}$ time domain resource, where the $i^{th}$ time domain resource is the time domain resource of the $i^{th}$ first transport block, and the valid resources are resource elements or resource blocks;

divide, based on the valid resources, the symbols corresponding to the $i^{th}$ time domain resource into $M_i$ symbol portions, where $M_i$ is an integer greater than or equal to 1, and an absolute value of a difference between valid resources on any two symbols included in each of the $M_i$ symbol portions is less than or equal to a second threshold;

determine the second quantity and the second transmission quantity based on a portion quantity $M_i$, a quantity of symbols included in each of the $M_i$ symbol portions, and the first transmission quantity of the $i^{th}$ first transport block; and determine the second code rate based on the first code rate, the first transmission quantity of the $i^{th}$ first transport block, and the second transmission quantity.

In an embodiment, the first quantity and/or the first transmission quantity are/is a power of 2.

In an embodiment, the sending unit 904 is further configured to:

send control information to a terminal device, where the control information indicates the first configuration, the modulation order, and the first code rate; and send first signaling to the terminal device, where the first signaling indicates a plurality of configurations, and the plurality of configurations include the first configuration.

In an embodiment, the control information includes a first indication field, the first indication field indicates a correspondence between a redundancy version and n, the first indication field is 1 bit, n represents an $n^{th}$ transmission of the second transport block, n=1, 2, . . . , $N_2$, and $N_2$ is the second quantity.

In an embodiment, that the sending unit 904 sends the first data to the first device based on the modulation order, the second code rate, and the valid resource of the second transport block includes:

determining a transport block size of the second transport block based on the modulation order, the second code rate, and the valid resource of the second transport block;

encoding the first data based on the transport block size of the second transport block, to obtain the second data; and sending the second data to the first device.

In an embodiment, a granularity of the time domain resource is one symbol, $2^{\Delta\mu}$ symbols, or a predefined time unit, and $\Delta\mu$ is determined based on a scheduled subcarrier spacing and a reference subcarrier spacing.

For more detailed descriptions of the first determining unit 901, the second determining unit 902, the third determining unit 903, and the sending unit 904, directly refer to related descriptions of the second device in the method embodiment shown in FIG. 8. Details are not described herein again.

Based on the network architecture, FIG. 10 is a schematic diagram of a structure of another communication apparatus according to an embodiment. As shown in FIG. 10, the communication apparatus may include a first determining unit 1001, a second determining unit 1002, a third determining unit 1003, a receiving unit 1004, a fourth determining unit 1005, and a sending unit 1006.

In a case, the communication apparatus may be a first device, or may be a module (for example, a chip) in a first device.

The first determining unit 1001 is configured to determine a first configuration, a modulation order, and a first code rate, where the first configuration includes a mapping type, a time domain resource, and a first quantity and/or a first transmission quantity, the first quantity is a quantity of first transport blocks, the first transmission quantity is a transmission quantity of the first transport block, and the first code rate is a code rate of the first transport block.

The second determining unit 1002 is configured to determine a second code rate, a second quantity, and a second transmission quantity based on the first code rate, the mapping type, and the first quantity and/or the first transmission quantity, where the second code rate is a code rate of a second transport block, the second quantity is a quantity of second transport blocks, and the second transmission quantity is a transmission quantity of the second transport block.

The third determining unit 1003 is configured to determine a valid resource of the second transport block based on the time domain resource, the second quantity, and the second transmission quantity.

The receiving unit 1004 is configured to receive second data from a second device.

The fourth determining unit 1005 is configured to determine first data based on the second data, the modulation order, the second code rate, and the valid resource of the second transport block.

In an embodiment, when the mapping type is a first type, the second determining unit 1002 may be configured to:

divide, based on a valid resource in each slot in the time domain resource, slots included in the time domain resource to obtain M slot portions, where M is an integer greater than or equal to 1, and an absolute value of a difference between valid resources in any two slots included in any one of the M slot portions is less than or equal to a first threshold;

determine the second quantity and the second transmission quantity based on a quantity of slots included in each of the M slot portions and the first transmission quantity; and determine the second code rate based on the first code rate, the first transmission quantity, and the second transmission quantity.

In an embodiment, that the second determining unit 1002 determines the second quantity and the second transmission quantity based on the quantity of slots included in each of the M slots portions and the first transmission quantity includes:

determining, based on the quantity of slots included in each of the M slot portions and the first transmission quantity, that the second quantity and the second transmission quantity meet the following relationships:

$$N_{2,m} = \lceil N_{s,m}/K_1 \rceil, \text{ and}$$

$$K_{2,m,k} = \begin{cases} K_1 & k = 1, \ldots, N_{2,m} - 1 \\ \text{mod}(N_{s,m}, K_1) & k = N_{2,m} \end{cases}$$

$N_{2,m}$ is a quantity of second transport blocks transmitted in an $m^{th}$ slot portion in the M slot portions, $N_{s,m}$ is a quantity of slots included in the $m^{th}$ slot portion, $K_1$ is the first transmission quantity, $K_{2,m,k}$ is a second transmission quantity of a $k^{th}$ second transport block in the second transport blocks transmitted in the $m^{th}$ slot portion, $\lceil \bullet \rceil$ is rounding up, $\text{mod}(\bullet)$ is a modulo operation, and m=1, . . . , M.

In an embodiment, the second determining unit 1002 determines, based on the first code rate, the first transmission quantity, and the second transmission quantity, that a second code rate of a $j^{th}$ second transport block meets the following relationship:

$$C_1 \times K_{2,j}/K_1$$

$C_1$ is the first code rate, $K_1$ is the first transmission quantity, $K_{2,j}$ is a second transmission quantity of the $j^{th}$ second transport block, j=1, . . . , $N_2$, and $N_2$ is the second quantity.

In an embodiment, when the mapping type is a second type, the second determining unit 1002 may be configured to:

determine the first code rate as the second code rate;

determine the first quantity as the second quantity; and determine the first transmission quantity as the second transmission quantity.

In an embodiment, the third determining unit 1003 may be configured to:

determine a total valid resource based on the time domain resource, where the total valid resource is a resource in a time-frequency resource other than a resource occupied by one or more of a control channel, a synchronization signal block, a reference signal, a random access channel, a reserved resource, and overheads; and the time-frequency resource is a time-frequency resource scheduled for the first data; and determine the valid resource of the second transport block based on the total valid resource, the second quantity, and the second transmission quantity.

In an embodiment, that the third determining unit 1003 determines the valid resource of the second transport block based on the total valid resource, the second quantity, and the second transmission quantity includes:

dividing the total valid resource into valid resources of the second quantity, to obtain the valid resource of the second transport block, where the valid resource is a symbol, a resource element, or a resource block; and dividing the valid resource of the second transport block into valid resources of the second transmission quantity, to obtain a valid resource for each transmission of the second transport block.

In an embodiment, that the third determining unit 1003 determines the valid resource of the second transport block based on the total valid resource, the second quantity, and the second transmission quantity includes:

dividing the total valid resource into valid resources of a first product, to obtain a valid resource for each transmission of the second transport block, where the first product is a product of the second quantity and the second transmission quantity, and the valid resource is a resource element or a resource block.

In an embodiment, the first quantity and/or the first transmission quantity are/is a power of 2.

In an embodiment, the sending unit 1006 is configured to send control information to a terminal device, where the control information indicates the first configuration, the modulation order, and the first code rate.

The sending unit 1006 is further configured to send first signaling to the terminal device, where the first signaling indicates a plurality of configurations, and the plurality of configurations include the first configuration.

In an embodiment, the control information includes a first indication field, the first indication field indicates a correspondence between a redundancy version and n, the first indication field is 1 bit, n represents an $n^{th}$ transmission of the second transport block, n=1, 2, . . . , $N_2$, and $N_2$ is the second quantity.

In an embodiment, the fourth determining unit 1005 may be configured to:

determine a transport block size of the second transport block based on the modulation order, the second code rate, and the valid resource of the second transport block; and decode the second data based on the transport block size of the second transport block, to obtain the first data.

In an embodiment, a granularity of the time domain resource is one symbol, $2^{\Delta\mu}$ symbols, or a predefined time unit, and $\Delta\mu$ is determined based on a scheduled subcarrier spacing and a reference subcarrier spacing.

For more detailed descriptions of the first determining unit 1001, the second determining unit 1002, the third determining unit 1003, the receiving unit 1004, the fourth determining unit 1005, and the sending unit 1006, directly refer to related descriptions of the first device in the method embodiment shown in FIG. 5. Details are not described herein again.

In a case, the communication apparatus may be a first device, or may be a module (for example, a chip) in a first device.

The first determining unit 1001 is configured to determine a first configuration, a modulation order, and a first code rate, where the first configuration includes information about a first quantity of first transport blocks, the information includes a first transmission quantity and a time domain resource, and the first code rate is a code rate of the first transport block.

The second determining unit 1002 is configured to determine a second code rate, a second quantity, and a second transmission quantity based on the first code rate and a first transmission quantity of an $i^{th}$ first transport block, where the second code rate is a code rate of a second transport block corresponding to the $i^{th}$ first transport block, the second quantity is a quantity of second transport blocks corresponding to the $i^{th}$ first transport block, the second transmission quantity is a transmission quantity of the second transport block corresponding to the $i^{th}$ first transport block, i=1, 2, . . . , $N_1$, and $N_1$ is the first quantity.

The third determining unit 1003 is configured to determine a valid resource of the second transport block based on a time domain resource of the $i^{th}$ first transport block, the second quantity, and the second transmission quantity.

The receiving unit 1004 is configured to receive second data from a second device.

The fourth determining unit 1005 is configured to determine first data based on the second data, the modulation order, the second code rate, and the valid resource of the second transport block.

In an embodiment, the second determining unit 1002 may be configured to:

determine the first code rate as the second code rate;

determine that the second quantity is 1; and determine the first transmission quantity of the $i^{th}$ first transport block as the second transmission quantity.

In an embodiment, the third determining unit 1003 may be configured to:

determine a valid resource of the $i^{th}$ first transport block based on the time domain resource of the $i^{th}$ first transport block, where the valid resource is a symbol, a resource element, or a resource block; and divide the valid resource into valid resources of the second transmission quantity, to obtain a valid resource for each transmission of the second transport block.

In an embodiment, the second determining unit 1002 may be configured to:

determine valid resources on different symbols in an $i^{th}$ time domain resource, where the $i^{th}$ time domain resource is the time domain resource of the $i^{th}$ first transport block, and the valid resources are resource elements or resource blocks;

divide, based on the valid resources, the symbols corresponding to the $i^{th}$ time domain resource into $M_i$ symbol portions, where $M_i$ is an integer greater than or equal to 1, and an absolute value of a difference between valid resources on any two symbols included in each of the $M_i$ symbol portions is less than or equal to a second threshold;

determine the second quantity and the second transmission quantity based on a portion quantity $M_i$, a quantity of symbols included in each of the $M_i$ symbol portions, and the first transmission quantity of the $i^{th}$ first transport block; and determine the second code rate based on the first code rate, the first transmission quantity of the $i^{th}$ first transport block, and the second transmission quantity.

In an embodiment, the first quantity and/or the first transmission quantity are/is a power of 2.

In an embodiment, the sending unit 1006 is configured to send control information to a terminal device, where the control information indicates the first configuration, the modulation order, and the first code rate.

The sending unit 1006 is further configured to send first signaling to the terminal device, where the first signaling indicates a plurality of configurations, and the plurality of configurations include the first configuration.

In an embodiment, the control information includes a first indication field, the first indication field indicates a correspondence between a redundancy version and n, the first indication field is 1 bit, n represents an $n^{th}$ transmission of the second transport block, n=1, 2, . . . , $N_2$, and $N_2$ is the second quantity.

In an embodiment, the fourth determining unit 1005 may be configured to:

determine a transport block size of the second transport block based on the modulation order, the second code rate, and the valid resource of the second transport block; and decode the second data based on the transport block size, to obtain the first data.

In an embodiment, a granularity of the time domain resource is one symbol, $2^{\Delta\mu}$ symbols, or a predefined time unit, and $\Delta\mu$ is determined based on a scheduled subcarrier spacing and a reference subcarrier spacing.

For more detailed descriptions of the first determining unit 1001, the second determining unit 1002, the third determining unit 1003, the receiving unit 1004, the fourth determining unit 1005, and the sending unit 1006, directly refer to related descriptions of the first device in the method embodiment shown in FIG. 8. Details are not described herein again.

Figure 11:
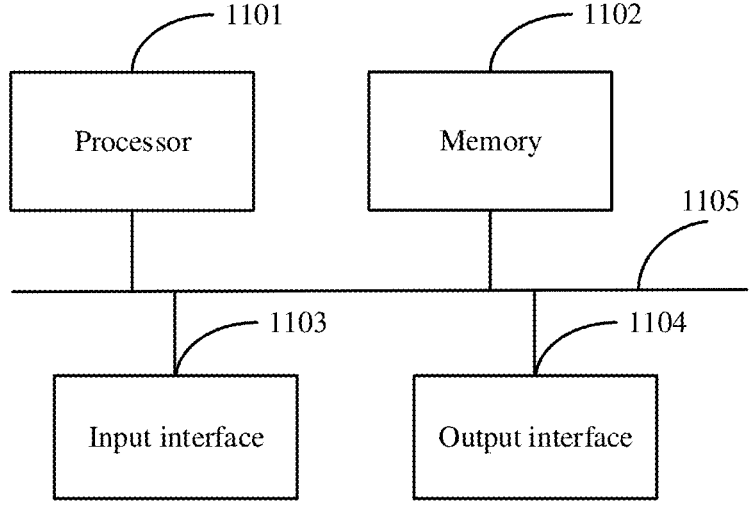
FIG. 11 is a schematic diagram of a structure of another communication apparatus according to an embodiment.

Based on the network architecture, FIG. 11 is a schematic diagram of a structure of another communication apparatus according to an embodiment. As shown in FIG. 11, the communication apparatus may include a processor 1101, a memory 1102, an input interface 1103, an output interface 1104, and a bus 1105. The memory 1102 may exist independently and may be connected to the processor 1101 through the bus 1105. Alternatively, the memory 1102 may be integrated with the processor 1101. The bus 1105 is configured to connect these components.

In an embodiment, the communication apparatus may be a second device or a module (for example, a chip) in a second device. When computer program instructions stored in the memory 1102 are executed, the processor 1101 is configured to control the sending unit 904 to perform an operation performed in the foregoing embodiment. The processor 1101 is further configured to perform operations performed by the first determining unit 901, the second determining unit 902, and the third determining unit 903 in the foregoing embodiment. The input interface 1103 is configured to receive information from another communication apparatus other than the communication apparatus. The output interface 1104 is configured to perform an operation performed by the sending unit 904 in the foregoing embodiment. The second device or the modules in the second device may be further configured to perform the methods performed by the second device in the method embodiments in FIG. 5 and FIG. 8. Details are not described again.

In an embodiment, the communication apparatus may be a first device or a module (for example, a chip) in a first device. When computer program instructions stored in the memory 1102 are executed, the processor 1101 is configured to control the receiving unit 1004 and the sending unit 1006 to perform operations performed in the foregoing embodiment. The processor 1101 is further configured to perform operations performed by the first determining unit 1001, the second determining unit 1002, the third determining unit 1003, and the fourth determining unit 1005 in the foregoing embodiment. The input interface 1103 is configured to perform an operation performed by the receiving unit 1004 in the foregoing embodiment. The output interface 1104 is configured to perform an operation performed by the sending unit 1006 in the foregoing embodiment. The first device or the modules in the first device may be further configured to perform the methods performed by the first device in the method embodiments in FIG. 5 and FIG. 8. Details are not described again.

Figure 12:
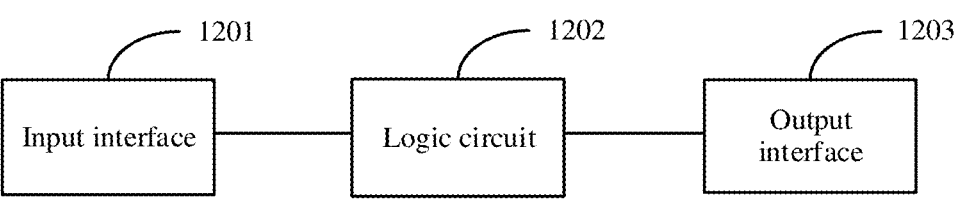
FIG. 12 is a schematic diagram of a structure of another communication apparatus according to an embodiment.

Based on the network architecture, FIG. 12 is a schematic diagram of a structure of another communication apparatus according to an embodiment. As shown in FIG. 12, the communication apparatus may include an input interface 1201, a logic circuit 1202, and an output interface 1203. The input interface 1201 is connected to the output interface 1203 through the logic circuit 1202. The input interface 1201 is configured to receive information from another communication apparatus, and the output interface 1203 is configured to output, schedule, or send information to the another communication apparatus. The logic circuit 1202 is configured to perform an operation other than operations of the input interface 1201 and the output interface 1203, for example, implement a function implemented by the processor 1101 in the foregoing embodiment. The communication apparatus may be a network device or a module of a network device or may be a first terminal device or a module of a first terminal device or may be a second terminal device or a module of a second terminal device. For more detailed descriptions of the input interface 1201, the logic circuit 1202, and the output interface 1203, directly refer to related descriptions of the first entity and the SMF network element in the foregoing method embodiments. Details are not described herein again.

An embodiment may further include a computer-readable storage medium storing instructions. When the instructions are executed, the method in the foregoing method embodiments is performed.

An embodiment may further include a computer program product including instructions. When the instructions are executed, the method in the foregoing method embodiments is performed.

An embodiment may further include a communication system. The communication system includes a first device and a second device. For descriptions, refer to the communication methods shown in FIG. 5 and FIG. 8.

In the foregoing implementations, the objectives, solutions, and beneficial effects are further described in detail. It should be understood that the foregoing descriptions are merely implementations, but are not intended as limiting. Any modification, equivalent replacement, improvement, or the like made based on the solutions shall fall within the scope of the embodiments.

What is claimed is:

1. A communication method, comprising:

determining a first configuration, a modulation order, and a first code rate, wherein the first configuration comprises a mapping type, a time domain resource, and a first quantity and/or a first transmission quantity, the first quantity is a quantity of first transport blocks, the first transmission quantity is a transmission quantity of the first transport block, and the first code rate is a code rate of the first transport block;

determining a second code rate, a second quantity, and a second transmission quantity based on the first code rate, the mapping type, and the first quantity and/or the first transmission quantity, wherein the second code rate is a code rate of a second transport block, the second quantity is a quantity of second transport blocks, and the second transmission quantity is a transmission quantity of the second transport block;

determining a valid resource of the second transport block based on the time domain resource, the second quantity, and the second transmission quantity; and sending second data to a first device based on first data, the modulation order, the second code rate, and the valid resource of the second transport block.

2. The communication method according to claim 1, wherein when the mapping type is a first type, determining the second code rate, the second quantity, and the second transmission quantity based on the first code rate, the mapping type, and the first quantity and/or the first transmission quantity further comprises:

dividing, based on a valid resource in each slot in the time domain resource, slots comprised in the time domain resource into M slot portions, wherein M is an integer greater than or equal to 1, and an absolute value of a difference between valid resources in any two slots comprised in any one of the M slot portions is less than or equal to a first threshold;

determining the second quantity and the second transmission quantity based on a quantity of slots comprised in each of the M slot portions and the first transmission quantity; and determining the second code rate based on the first code rate, the first transmission quantity, and the second transmission quantity.

3. The communication method according to claim 2, wherein determining the second quantity and the second transmission quantity based on the quantity of slots comprised in each of the M slot portions and the first transmission quantity further comprises:

determining, based on the quantity of slots comprised in each of the M slot portions and the first transmission quantity, that the second quantity and the second transmission quantity meet the following relationships:

$$N_{2,m} = \lceil N_{s,m}/K_1 \rceil, \text{ and}$$

$$K_{2,m,k} = \begin{cases} K_1 & k = 1, \dots, N_{2,m}-1 \\ \mathrm{mod}(N_{s,m}, K_1) & k = N_{2,m} \end{cases},$$

wherein $N_{2,m}$ is a quantity of second transport blocks transmitted in an $m^{th}$ slot portion in the M slot portions, $N_{s,m}$ is a quantity of slots comprised in the $m^{th}$ slot portion, $K_1$ is the first transmission quantity, $K_{2,m,k}$ is a second transmission quantity of a $k^{th}$ second transport block in the second transport blocks transmitted in the $m^{th}$ slot portion, $\lceil \cdot \rceil$ is rounding up, $\mathrm{mod}(\cdot)$ is a modulo operation, and $m=1, \dots, M$.

4. The communication method according to claim 2, wherein determining, based on the first code rate, the first transmission quantity, and the second transmission quantity, that the second code rate of a $j^{th}$ second transport block meets the following relationship:

$$C_1 \times K_{2,j}/K_1, \text{ wherein}$$

$C_1$ is the first code rate, $K_1$ is the first transmission quantity, $K_{2,j}$ is a second transmission quantity of the $j^{th}$ second transport block, $j=1, \dots, N_2$, and $N_2$ is the second quantity.

5. The communication method according to claim 1, wherein, when the mapping type is a second type, determining the second code rate, the second quantity, and the second transmission quantity based on the first code rate, the mapping type, and the first quantity and/or the first transmission quantity further comprises:

determining the first code rate as the second code rate;

determining the first quantity as the second quantity; and determining the first transmission quantity as the second transmission quantity.

6. The communication method according to claim 1, wherein the valid resource corresponds to a portion of the time domain resource.

7. The communication method according to claim 1, wherein the valid resource is used for transmission of the second transport block.

8. A communication method, comprising:

determining a first configuration, a modulation order, and a first code rate, wherein the first configuration comprises a mapping type, a time domain resource, and a first quantity and/or a first transmission quantity, the first quantity is a quantity of first transport blocks, the first transmission quantity is a transmission quantity of the first transport block, and the first code rate is a code rate of the first transport block;

determining a second code rate, a second quantity, and a second transmission quantity based on the first code rate, the mapping type, and the first quantity and/or the first transmission quantity, wherein the second code rate is a code rate of a second transport block, the second quantity is a quantity of second transport blocks, and the second transmission quantity is a transmission quantity of the second transport block;

determining a valid resource of the second transport block based on the time domain resource, the second quantity, and the second transmission quantity;

receiving second data from a second device; and determining first data based on the second data, the modulation order, the second code rate, and the valid resource of the second transport block.

9. The communication method according to claim 8, wherein, when the mapping type is a first type, determining the second code rate, the second quantity, and the second transmission quantity based on the first code rate, the mapping type, and the first quantity and/or the first transmission quantity further comprises:

dividing, based on a valid resource in each slot in the time domain resource, slots comprised in the time domain resource into M slot portions, wherein M is an integer greater than or equal to 1, and an absolute value of a difference between valid resources in any two slots comprised in any one of the M slot portions is less than or equal to a first threshold;

determining the second quantity and the second transmission quantity based on a quantity of slots comprised in each of the M slot portions and the first transmission quantity; and determining the second code rate based on the first code rate, the first transmission quantity, and the second transmission quantity.

10. The communication method according to claim 9, wherein determining the second quantity and the second transmission quantity based on the quantity of slots comprised in each of the M slot portions and the first transmission quantity further comprises:

determining, based on the quantity of slots comprised in each of the M slot portions and the first transmission quantity, that the second quantity and the second transmission quantity meet the following relationships:

$$N_{2,m} = \lceil N_{s,m}/K_1 \rceil, \text{ and}$$

$$K_{2,m,k} = \begin{cases} K_1 & k = 1, \ldots, N_{2,m} - 1 \\ \mod(N_{s,m}, K_1) & k = N_{2,m} \end{cases},$$

wherein $N_{2,m}$ is a quantity of second transport blocks transmitted in an $m^{th}$ slot portion in the M slot portions, $N_{s,m}$ is a quantity of slots comprised in the $m^{th}$ slot portion, $K_1$ is the first transmission quantity, $K_{2,m,k}$ is a second transmission quantity of a $k^{th}$ second transport block in the second transport blocks transmitted in the $m^{th}$ slot portion, $\lceil \bullet \rceil$ is rounding up, $\mod(\bullet)$ is a modulo operation, and $m=1, \ldots, M$.

11. The communication method according to claim 9, wherein determining, based on the first code rate, the first transmission quantity, and the second transmission quantity, that the second code rate of a $j^{th}$ second transport block meets the following relationship:

$$C_1 \times K_{2,j}/K_1, \text{ wherein}$$

$C_1$ is the first code rate, $K_1$ is the first transmission quantity, $K_{2,j}$ is a second transmission quantity of the $j^{th}$ second transport block, $j=1, \ldots, N_2$, and $N_2$ is the second quantity.

12. The communication method according to claim 8, wherein, when the mapping type is a second type, determining the second code rate, the second quantity, and the second transmission quantity based on the first code rate, the mapping type, and the first quantity and/or the first transmission quantity further comprises:

determining the first code rate as the second code rate;
determining the first quantity as the second quantity; and
determining the first transmission quantity as the second transmission quantity.

13. A communication apparatus, comprising:
at least one processor; and
one or more memories coupled to the at least one processor and the at least one processor invokes programming instructions stored in the one or more memories, and is configured to execute the programming instructions to cause the communication apparatus to:

determine a first configuration, a modulation order, and a first code rate, wherein the first configuration comprises a mapping type, a time domain resource, and a first quantity and/or a first transmission quantity, the first quantity is a quantity of first transport blocks, the first transmission quantity is a transmission quantity of the first transport block, and the first code rate is a code rate of the first transport block;

determine a second code rate, a second quantity, and a second transmission quantity based on the first code rate, the mapping type, and the first quantity and/or the first transmission quantity, wherein the second code rate is a code rate of a second transport block, the second quantity is a quantity of second transport blocks, and the second transmission quantity is a transmission quantity of the second transport block;

determine a valid resource of the second transport block based on the time domain resource, the second quantity, and the second transmission quantity;

receive second data from a second device; and determine first data based on the second data, the modulation order, the second code rate, and the valid resource of the second transport block.

14. The communication apparatus according to claim 13, wherein, when the mapping type is a first type, the communication apparatus is further configured to:

divide, based on a valid resource in each slot in the time domain resource, slots comprised in the time domain resource into M slot portions, wherein M is an integer greater than or equal to 1, and an absolute value of a difference between valid resources in any two slots comprised in any one of the M slot portions is less than or equal to a first threshold;

determine the second quantity and the second transmission quantity based on a quantity of slots comprised in each of the M slot portions and the first transmission quantity; and determine the second code rate based on the first code rate, the first transmission quantity, and the second transmission quantity.

15. The communication apparatus according to claim 14, wherein the communication apparatus being configured to determine the second quantity and the second transmission quantity based on the quantity of slots comprised in each of the M slot portions and the first transmission quantity further comprises:

determining, based on the quantity of slots comprised in each of the M slot portions and the first transmission quantity, that the second quantity and the second transmission quantity meet the following relationships:

$$N_{2,m} = \lceil N_{s,m}/K_1 \rceil, \text{ and}$$

$$K_{2,m,k} = \begin{cases} K_1 & k = 1, \ldots, N_{2,m} - 1 \\ \mod(N_{s,m}, K_1) & k = N_{2,m} \end{cases},$$

wherein $N_{2,m}$ is a quantity of second transport blocks transmitted in an $m^{th}$ slot portion in the M slot portions, $N_{s,m}$ is a quantity of slots comprised in the $m^{th}$ slot portion, $K_1$ is the first transmission quantity, $K_{2,m,k}$ is a second transmission quantity of a $k^{th}$ second transport block in the second transport blocks transmitted in the $m^{th}$ slot portion, $\lceil \bullet \rceil$ is rounding up, $\mod(\bullet)$ is a modulo operation, and $m=1, \ldots, M$.

16. The communication apparatus according to claim 14, wherein the communication apparatus is further configured to determine, based on the first code rate, the first transmission quantity, and the second transmission quantity, that a second code rate of a $j^{th}$ second transport block meets the following relationship:

$$C_1 \times K_{2,j}/K_1, \text{ wherein}$$

$C_1$ is the first code rate, $K_1$ is the first transmission quantity, $K_{2,j}$ is a second transmission quantity of the $j^{th}$ second transport block, $j=1, \ldots, N_2$, and $N_2$ is the second quantity.

17. The communication apparatus according to claim 13, wherein when the mapping type is a second type, the communication apparatus is further configured to:

determine the first code rate as the second code rate;

determine the first quantity as the second quantity; and determine the first transmission quantity as the second transmission quantity.

\* \* \* \* \*